(12) United States Patent
Gocke

(10) Patent No.: US 9,785,044 B2
(45) Date of Patent: Oct. 10, 2017

(54) SYSTEMS AND METHODS FOR AN IMMERSION THEATER ENVIRONMENT WITH DYNAMIC SCREENS

(71) Applicant: Barco, Inc., Rancho Cordova, CA (US)

(72) Inventor: Alexander William Gocke, Rancho Cordova, CA (US)

(73) Assignee: Barco, Inc., Rancho Cordova, CA (US)

( * ) Notice: Subject to any disclaimer, the term of this patent is extended or adjusted under 35 U.S.C. 154(b) by 0 days.

(21) Appl. No.: 14/957,438

(22) Filed: Dec. 2, 2015

(65) Prior Publication Data

US 2016/0165196 A1 Jun. 9, 2016

Related U.S. Application Data

(60) Provisional application No. 62/087,191, filed on Dec. 3, 2014.

(51) Int. Cl.
| | |
|---|---|
| *G03B 21/56* | (2006.01) |
| *G03B 21/58* | (2014.01) |
| *G03B 21/606* | (2014.01) |
| *H04N 9/31* | (2006.01) |
| *E04H 3/24* | (2006.01) |

(52) U.S. Cl.
CPC .............. *G03B 21/562* (2013.01); *E04H 3/24* (2013.01); *G03B 21/58* (2013.01); *G03B 21/606* (2013.01); *H04N 9/3147* (2013.01)

(58) Field of Classification Search
CPC ........ E04H 3/24; G03B 21/562; G03B 21/58; G03B 21/606; H04N 9/3147
See application file for complete search history.

(56) References Cited

U.S. PATENT DOCUMENTS

| | | |
|---|---|---|
| 5,623,878 A | 4/1997 | Baxter et al. |
| 8,705,177 B1 | 4/2014 | Miao |

(Continued)

FOREIGN PATENT DOCUMENTS

| | | | |
|---|---|---|---|
| WO | WO 8302028 A1 * | 6/1983 | ............. G09B 9/085 |
| WO | WO 97/15363 | 5/1997 | |
| WO | WO 2016/090036 | 6/2016 | |

OTHER PUBLICATIONS

PCT Search Report and Written opinion for PCT/US15/63502 mailed Feb. 16, 2016 in 17 pages.

(Continued)

*Primary Examiner* — Sultan Chowdhury
*Assistant Examiner* — Magda Cruz
(74) *Attorney, Agent, or Firm* — Knobbe, Martens, Olson & Bear, LLP

(57) ABSTRACT

Provided herein are systems and methods to configure an immersive theater environment by moving one or more screens. A movie screen can be provided with one or more actuators coupled to the movie screen, wherein the one or more actuators are configured to move the movie screen in a plurality of directions including, for example, up, down, left, right, back, forward, pitch, roll, and yaw. This system can include a processor coupled to the actuator, wherein the processor is configured to control the movement of the one or more actuators, synchronize cinema content for movement of the movie screen, process cinema content for metadata cues indicating movement of the movie screen, and track positions of the movie screen.

13 Claims, 27 Drawing Sheets

(56) References Cited

U.S. PATENT DOCUMENTS

2014/0340647 A1* 11/2014 Kim .......................... E04H 3/22
                                                    352/40
2016/0327804 A1* 11/2016 Basler .................... G02B 27/48

OTHER PUBLICATIONS

The Creators Project, Box by Box & Dolly Behind the Scenes, dated Oct. 1, 2013, https://www.youtube.com/watch?v=y4ajXJ3nj1Q.

* cited by examiner

SYSTEMS AND METHODS FOR AN IMMERSION THEATER ENVIRONMENT WITH DYNAMIC SCREENS

CROSS-REFERENCE TO RELATED APPLICATIONS

This application claims the benefit of priority from U.S. Prov. App'n No. 62/087,191, entitled "Systems and Methods for an Immersion Theater Environment with Dynamic Screens," filed Dec. 3, 2014, the entire contents of which is incorporated herein by reference.

BACKGROUND

Field

The present disclosure generally relates to the movement of screens inside movie cinemas and to the shape of those screens. In particular, the present disclosure relates to a variety of screens of various shapes configured to move in a number of directions, including a plurality of left, right, up, down, back, forth, roll, pitch, and yaw, and/or any combination of those directions. The present disclosure also relates to screens configured to dynamically change curvature.

Description of Related Art

Movie theaters display video content for viewing by audiences. Often, movie theaters have rows of seats from which the audiences can view video projected onto a single screen located in front of them. The screen is usually rectangular and fixed in position within the venue.

Certain attempts have been made to create a more immersive experience than can be provided by a single fixed screen in front of audiences. In some cases, venues have used multiple screens and/or larger screens. For example, IMAX theaters display video in domes instead of flat screens to surround audiences and to create a more immersive experience. However, IMAX and other theaters still use fixed screens and lack certain features that may provide a more immersive experience.

SUMMARY

Example embodiments described herein have innovative features, no single one of which is indispensable or solely responsible for their desirable attributes. Without limiting the scope of the claims, some of the advantageous features will now be summarized.

An immersive theater environment can include a plurality of projection systems arranged to provide immersive viewing of video such as movies. Such an immersive theater environment can include a plurality of projector systems that each projects video configured to complement one another to provide an immersive viewing experience for viewers. Each projector system can be configured to project its video onto a projection surface placed around an audience. In this way, the audience can experience a sense of immersion into the environment depicted in the video. Video provided by the plurality of projector systems may be projected on the plurality of projection surfaces creating a unified video presentation. Such immersive theater environments are capable of generating audiovisual presentations with a relatively high level of realism due at least in part to the quality of the images provided on the plurality of projection surfaces.

In multi-screen environments, such as an immersive theater environment, one or more side screens can move for the purposes of the one or more side screens moving into a position for advantageous viewing of movies or other video presentations. The side screens may also move during presentation of the movie, movement corresponding to cues in the content being displayed. The side screens may change shape to conform to a targeted shape for presentation of video content. The side and/or front screens can be made to move and/or change shape prior to a video presentation, during a video presentation, and/or after a video presentation. The change in shape and/or movement of the screen can be designed to affect a pleasing aesthetic while the screens are not in use or while only the front screen is in use. The change in shape and/or movement of the screen can be designed to complement the presentation of the video while the video is being presented. The screens can also have different shapes based at least in part on its role in the immersive display system.

In a first aspect, a system is provided that includes a movie screen and one or more actuators coupled to the movie screen, wherein the one or more actuators are configured to move the movie screen in a plurality of up, down, left, right, back, forward, pitch, roll, and yaw. The system includes a processor coupled to the actuator, the processor configured to control the movement of the one or more actuators, synchronize cinema content for movement of the movie screen, process cinema content for metadata cues indicating movement of the movie screen, and track positions of the movie screen.

In some embodiments of the first aspect, the one or more actuators are further configured to curve the movie screen. In some embodiments of the first aspect, the movie screen comprises a continuous screen that curves around an audience. In some embodiments of the first aspect, the system further includes a rail system, wherein the one or more actuators are configured to slide the movie screen on the rail system. In some embodiments of the first aspect, the system further includes one or more hinges disposed along edges of the movie screen allowing the movie screen to swing. In some embodiments of the first aspect, the movie screen is shaped as one of a trapezoid, triangle, rhombus, circle, ellipse, sphere, elliptical surface, and torus.

In a second aspect, a system is provided that includes a plurality of movie screens with a corresponding plurality of actuators coupled to individual movie screens, wherein the plurality of actuators are configured to move each of the plurality of movie screens in a plurality of up, down, left, right, back, forward, pitch, roll, and yaw. The system includes a processor coupled to the plurality of actuators, the processor configured to control the movement of the plurality of actuators, synchronize cinema content for the plurality of movie screens, process cinema content for metadata cues indicating movement of the plurality of movie screens, and track positions of the plurality of movie screens.

In some embodiments of the second aspect, the one or more actuators are further configured to curve the plurality of movie screens. In some embodiments of the second aspect, the processor is further configured to coordinate one or more projectors using at least the positions of the plurality of movie screens. In further embodiments, the processor is further configured to adjust cinema content for the curvatures.

In some embodiments of the second aspect, the plurality of movie screens comprises a front screen, a right screen, and a left screen. In further embodiments, the right screen and the left screen are trapezoidal in shape. In further embodiments, the right screen and left screen are further coupled to a rail system that is configured to slide the right screen and the left screen.

In a third aspect, a method is provided that includes projecting a cinema presentation onto a movie screen. The method also includes analyzing metadata cues in the cinema presentation. The method also includes moving the movie screen in a plurality of down, left, right, back, forward, pitch, roll, and yaw based on at least the metadata cues. The method also includes synchronizing the cinema presentation projection to the movement of the movie screen.

In a fourth aspect, a method is provided that includes projecting a cinema presentation onto a plurality of movie screens. The method also includes analyzing metadata cues in the cinema presentation. The method also includes moving one or more of the plurality of movie screens in a plurality of up, down, left, right, back, forward, pitch, roll, and yaw based on at least the metadata cues. The method also includes synchronizing the cinema presentation projection to the movement of the one or more of the plurality of movie screens.

In some embodiments of the third or fourth aspect, the method further includes curving one or more of the plurality of movie screens in response to the metadata cues. In some embodiments of the third or fourth aspect, the method further includes storing one or more of the plurality of movie screens in drums and then dropping down the stored movie screens in response to metadata cues.

In any of the aspects above, the one or more actuators are further configured to move the movie screen before, during, and after a movie presentation. In any of the aspects above, the movie screen is configured to curve at least one of before, during, and after a movie presentation.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

DETAILED DESCRIPTION

Although certain embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described below. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Described herein are various example embodiments of methods and systems related to moving screens, curving screens, and/or using screens of different shapes to create a more immersive viewing experience at movie cinemas and other venues. It should be understood that the described embodiments can be used in immersive theater environments as well as other venues or locations that provide video presentations. For example, the disclosed systems and methods can be used in conference settings, exhibitions, classrooms, meeting rooms, planetariums, museums, home theater systems, outdoor presentations (e.g., outdoor theaters and/or drive-ins), and/or any environment where visual presentations can be made and where it is desirable to provide a dynamic viewing environment to provide an immersive viewing experience. Accordingly, the disclosed systems and methods extend to uses in these scenarios and locations although the description focuses on implementation within an immersive theater environment.

Throughout this disclosure, reference will be made to a screen or movie screen. It should be appreciated that screens can take any number of forms. For example, screens may be any projection surface suitable for viewing video projected onto the surface or any display configured to display video to a viewer. Screens can include, for example and without limitation, front projection screens, back projection screens, liquid-crystal displays (LCDs), light-emitting diode (LED) displays, LED LCD displays, in-plane switching panels (IPSs), cathode ray tubes, plasma displays, ultra-high definition (HD) panels, 4K displays, retina displays, organic LED displays, surfaces, canvases, and/or any displays, televisions, monitors, panels, and/or devices known in the art for visual presentation.

Figure 1A:
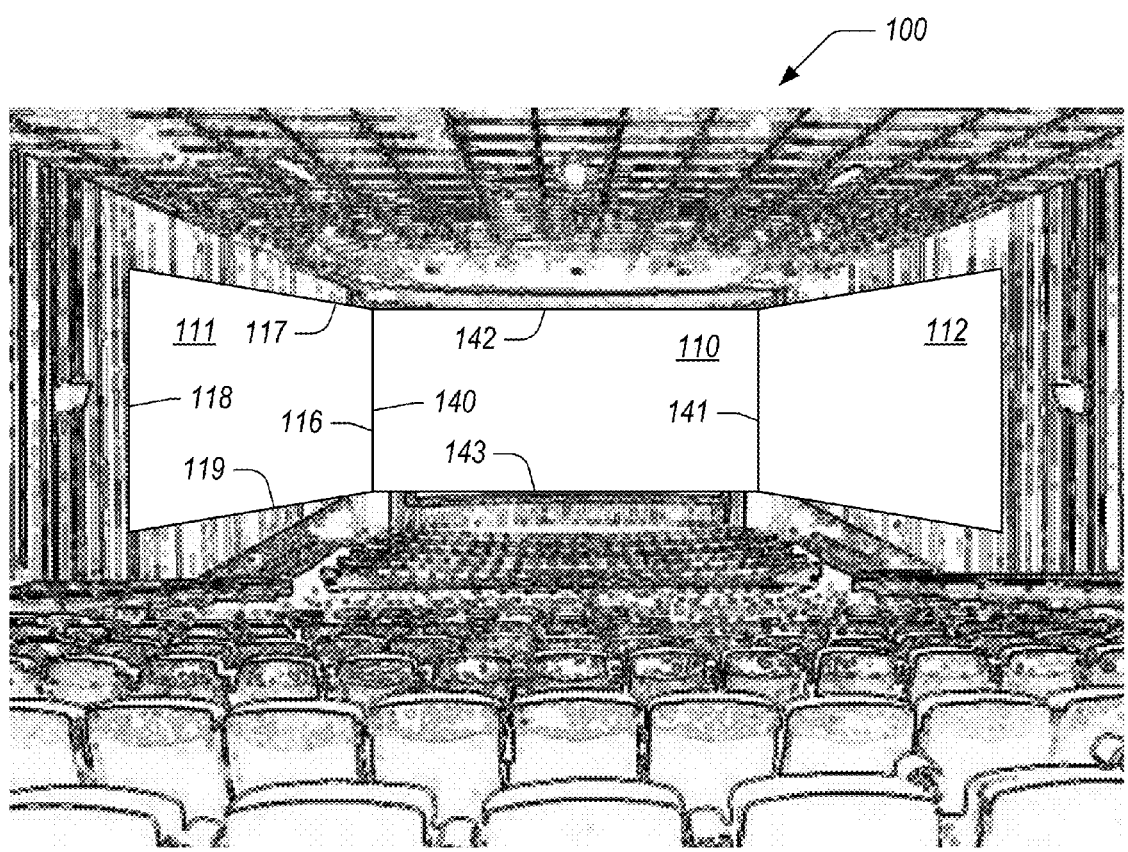
FIG. 1A is an illustration of an exemplary multi-screen cinema environment having front, left, and right screens.

FIG. 1A is an illustration of an example multi-screen cinema environment 100 having front 110, left 111, and right screens 112. Front screen 110 is a screen located in front of the audience. Left screen 111 and right screen 112 are screens located to the sides of the audience. Front screen 110 has four edges, including top edge 142, bottom edge 143, left edge 140, and right edge 141. Left screen 111 and right screen 112 also have four edges. For example, left screen 111 has front edge 116 (the edge closest to front screen 110), rear edge 118 (the edge farthest away from front screen 110), top edge 117 (the edge closest to the ceiling), and bottom edge 119 (the edge closest to the floor). Right screen 112 has similar edges.

Figure 1B:
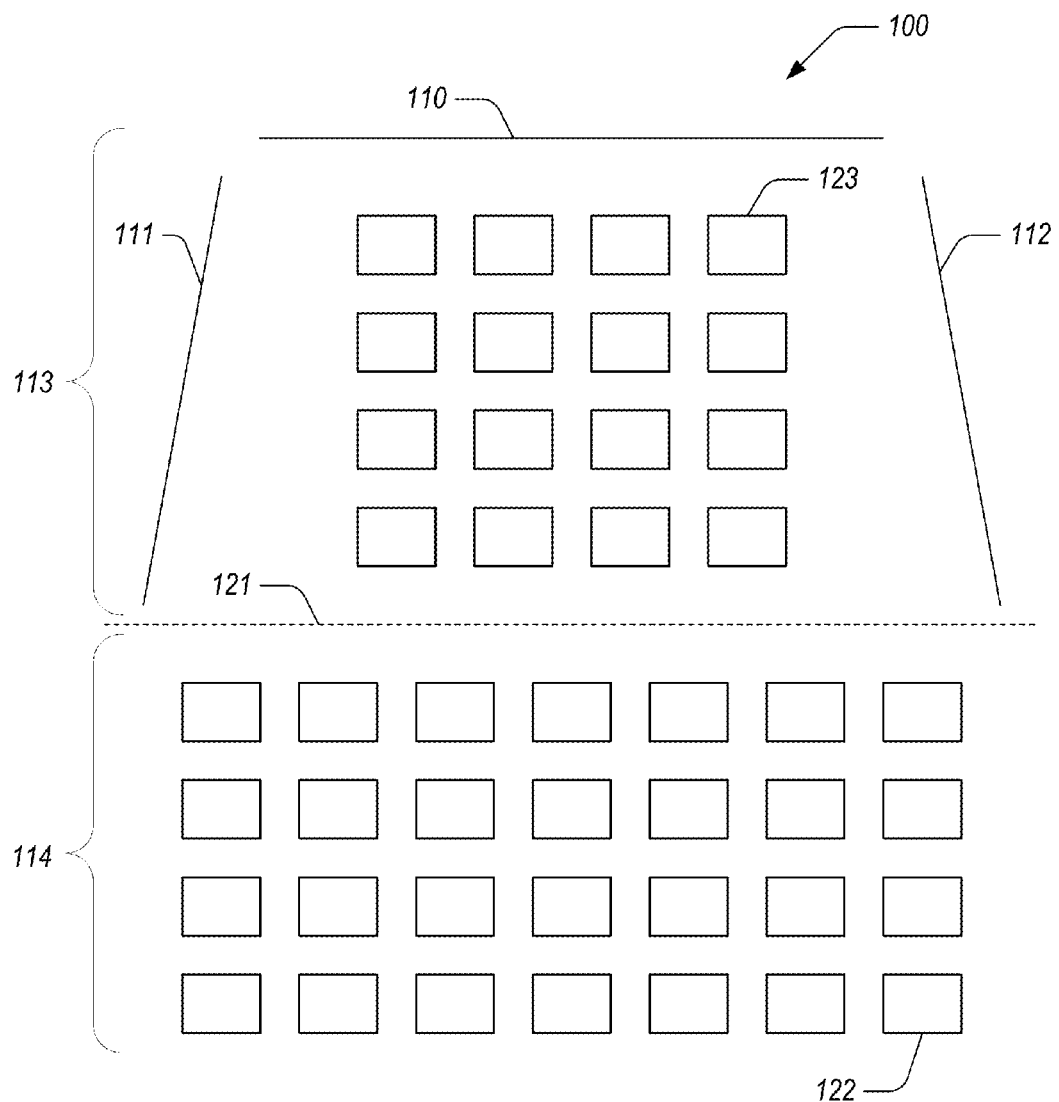
FIG. 1B illustrates an example seating arrangement for the multi-screen cinema environment of FIG. 1A.

FIG. 1B illustrates an example seating arrangement for the multi-screen cinema environment 100. Audience members in immersion zone 113 may be immersed by the front screen 110, left screen 111, and right screen 112. In some embodiments, the audience in immersion zone 113 may be seated in seats such as seat 123. In some embodiments, the audience may also be standing and/or otherwise positioned in immersion zone 113. In the multi-screen cinema environment 100, immersion zone 113 may span from front screen 110 to boundary 121, which is an illustrative line connecting the rear edges of left screen 111 and right screen 112. It may also span the area between left screen 111 and right screen 112. Beyond boundary 121 to the rear is viewing zone 114.

Seats, such as seat 122, in viewing zone 114 may be at least partially immersed in the multi-screen cinema environment, being able to view the front screen 110 and a majority of or at least a portion of left screen 111 and/or right screen 112. The audience may also be standing and/or otherwise positioned in viewing zone 114.

Figure 1C:
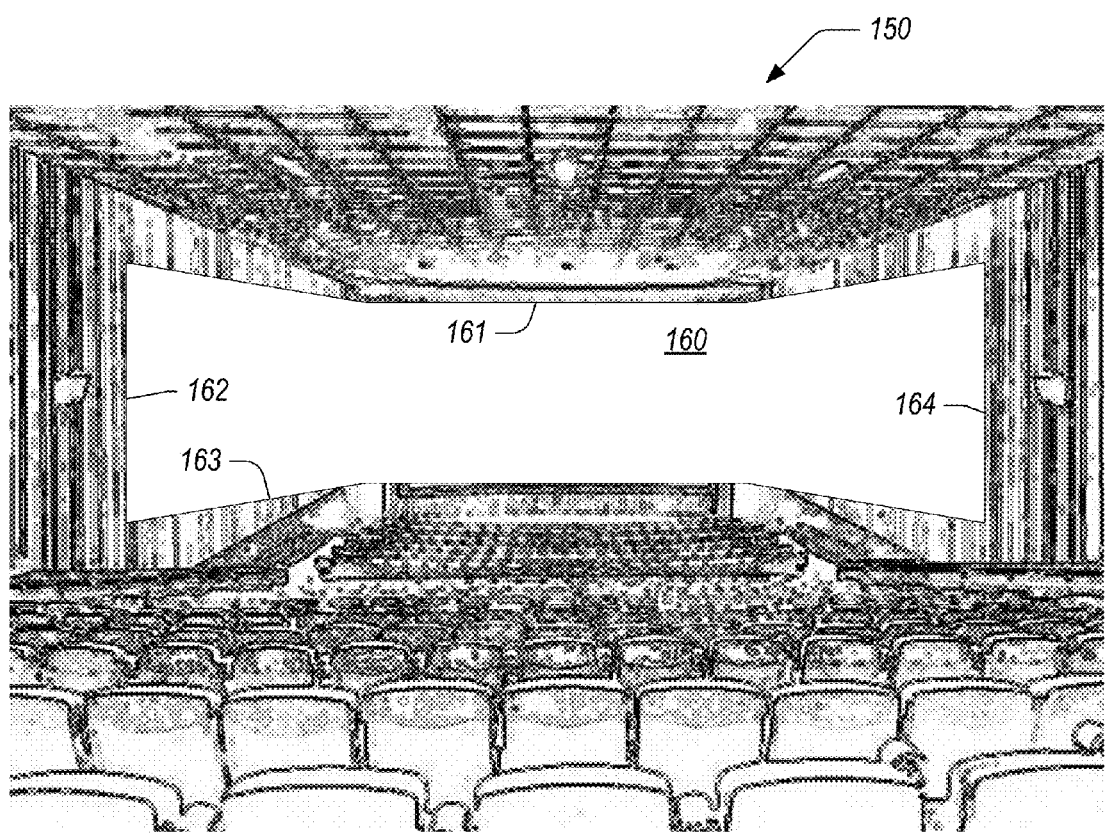
FIG. 1C is an illustration of an exemplary continuous screen cinema environment having a screen that extends beyond the front of the auditorium to at least a portion of the sides of the audience.

FIG. 1C is an illustration of an example continuous screen cinema environment 150 having a screen 160 that extends beyond the front of the auditorium to the sides of the audience. Screen 160 extends across the front and sides of the audience. Screen 160 has left edge 162, right edge 164, top edge 161, and bottom edge 163.

Figure 1D:
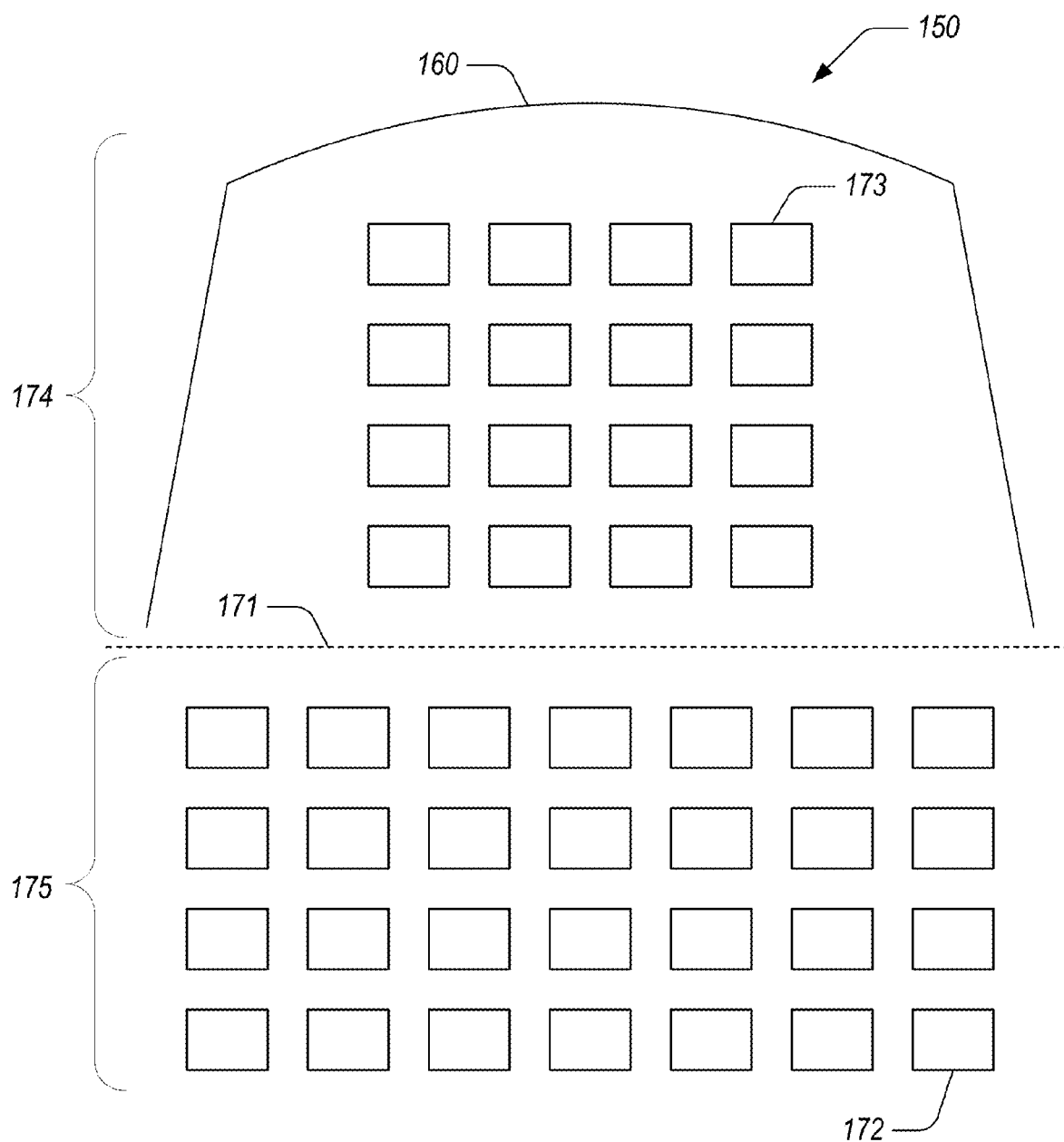
FIG. 1D illustrates an example seating arrangement for the continuous screen cinema environment of FIG. 1C.

FIG. 1D illustrates an example seating arrangement for the continuous screen cinema environment 150. Screen 160 may have an immersion zone 174 where audience members are immersed by screen 160. In some embodiments, the audience in immersion zone 174 may be seated in seats such as seat 173. In some embodiments, the audience may also be standing and/or otherwise positioned in immersion zone 174. In the continuous screen cinema environment 150, immersion zone 174 may span throughout the area within screen 160. Boundary 171 is an imaginary line extending between the left edge and the right edge of screen 160. Beyond boundary 171 is a viewing zone 175. Seats, such as seat 172, in the viewing zone 175 may be partially immersed in the continuous cinema environment 150, being able to view a majority or at least portions of screen 160. The audience may also be standing and/or otherwise positioned in viewing zone 175.

Figure 2A:
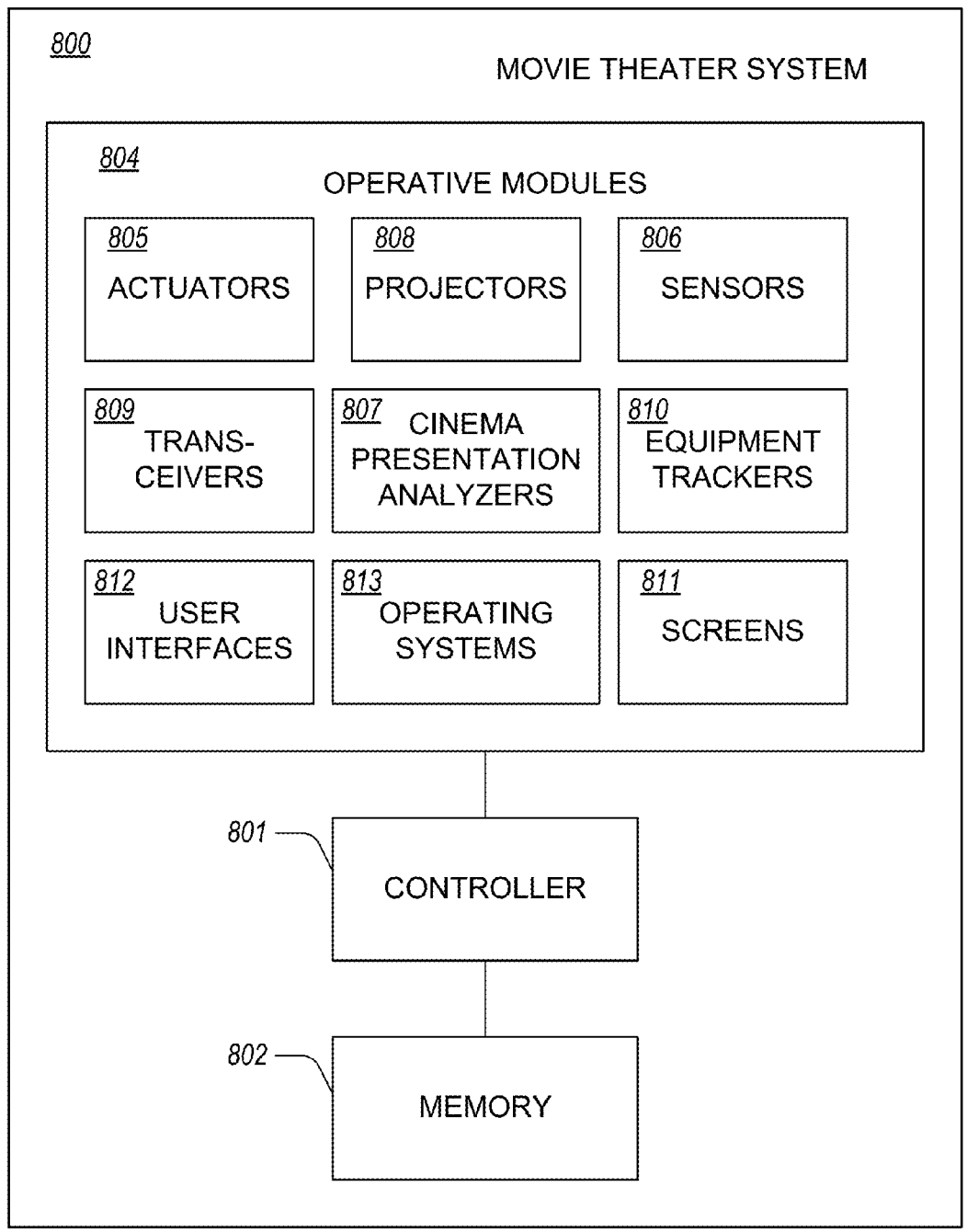
FIG. 2A illustrates an example of a functional block diagram of an embodiment of a movie theater system.

FIG. 2A illustrates an example of a functional block diagram of an embodiment of a movie theater system. Movie theater system 800 includes a processor/controller 801 that controls the basic operations of the movie theater system 800. Processor/controller 801 may be coupled to memory 802, which may include both read-only memory (ROM) and random access memory (RAM), and may provide instructions and data to the processor/controller 801. A portion of memory 802 may include non-volatile random access memory (NVRAM). Processor/controller 801 typically performs logical and arithmetic operations based on program instructions stored within the memory 802. Instructions in the memory 802 may be executable to implement the methods described herein. Operative modules in components 804 may be coupled to processor/controller 801. Data from the operative modules in component 804 may be processed and analyzed by processor/controller 801 in order to coordinate their functionality. These modules may include actuators, projectors, sensors, transceivers, cinema presentation analyzers, equipment trackers, user interfaces, screens, and/or operating systems.

For example, screens 811 may be used to display a cinematic presentation. Screens 811 may include front screen 110, left side screen 111, and/or right side screen 112 (FIG. 1A), screen 115 (FIG. 1C), and/or any other screen in this disclosure and/or known in the art.

Actuators 805 may be used to move screens 811 and/or projectors 808. Actuators 805 may comprise mechanical drivers, such as pneumatics, hydraulics, racks and pinions, motor/gear systems, pulleys, rails, magnetic systems (e.g., solenoid/ratchet system), inflatable bladders, electrical motors (e.g., brushless DC motors, DC stepper motors, ultrasonic motors, DC brushed motors, AC motors, etc.), gas-powered motors, piezoelectric systems (e.g., an inchworm motor), magnetostrictive elements, gesticulation, and/or any way of driving an actuator known in the art. Thus, as used in this disclosure, the term "actuator" and "actuators" will be understood to mean an actuator using any of the aforementioned mechanical drivers as well as any mechanical drivers known in the art capable of moving a viewing plane.

Projectors 808 may project cinema presentations onto screens for viewing. Projectors 808 may comprise multiple projectors that are coordinated together using the various technologies described in this disclosure.

Sensors 806 may be used to measure the position and/or orientation of screens 811, actuators 805, projectors 808, and/or any element of movie theater system 800. As will be described in this disclosure, sensors 806 may measure the physical location, angle, curvature, and/or other physical characteristics.

Cinema presentation analyzers 807 may be used to analyze and process cinema data. This may include the analysis of videos and/or images for display, and/or other data, such as metadata, that can be used to transmit instructional information in the movie theater system 800. For example, metadata may be transmitted to instruct movie theater system 800 to move screens 811, actuate one or more of the actuators 805, turn on/off projectors 808, and/or any other process in running movie theater system 800.

Equipment trackers 810 may include other technologies that can be used to synchronize the operative modules in component 804. For example, equipment trackers 810 may include transmitters that indicate the coordinates of objects in the movie theater system 800, such as the coordinates of sensors 806, actuators 805, projectors 808, screens 811, and/or any element of movie theater system 800. Equipment trackers 810 may also track performance characteristics of the operative modules in component 804, including battery life, synchronization, errors/alerts, and/or any other relevant data to performance.

User interfaces 812 may be used to allow the user such as a theater operator to control any of the operative modules in component 804 and/or provide any information to movie theater system 800. For example, a user may utilize user interfaces 812 to move projectors 808 and/or screens 811 as desired.

Transceivers 809 may be used to communicate data and/or information wirelessly between the various operative modules in component 804, including actuators 805, projectors 808, sensors 806, and/or processor/controller 801. The data and/or information may include positional information, synchronizing cues, and/or instructions. Transceivers 809 may use Bluetooth, ZigBee, Wi-Fi, induction wireless data transmission, radio frequencies, near-field communication (NFC), global system for mobile communications (GSM), and/or any other form of wireless data transmission.

Operating systems 813 may be used to configure processor/controller 801 to manage the working memory 802 and the processing resources of movie theater system 800. For example, operating system 813 may include device drivers to manage hardware resources in example movie theater system 800.

Figure 2B:
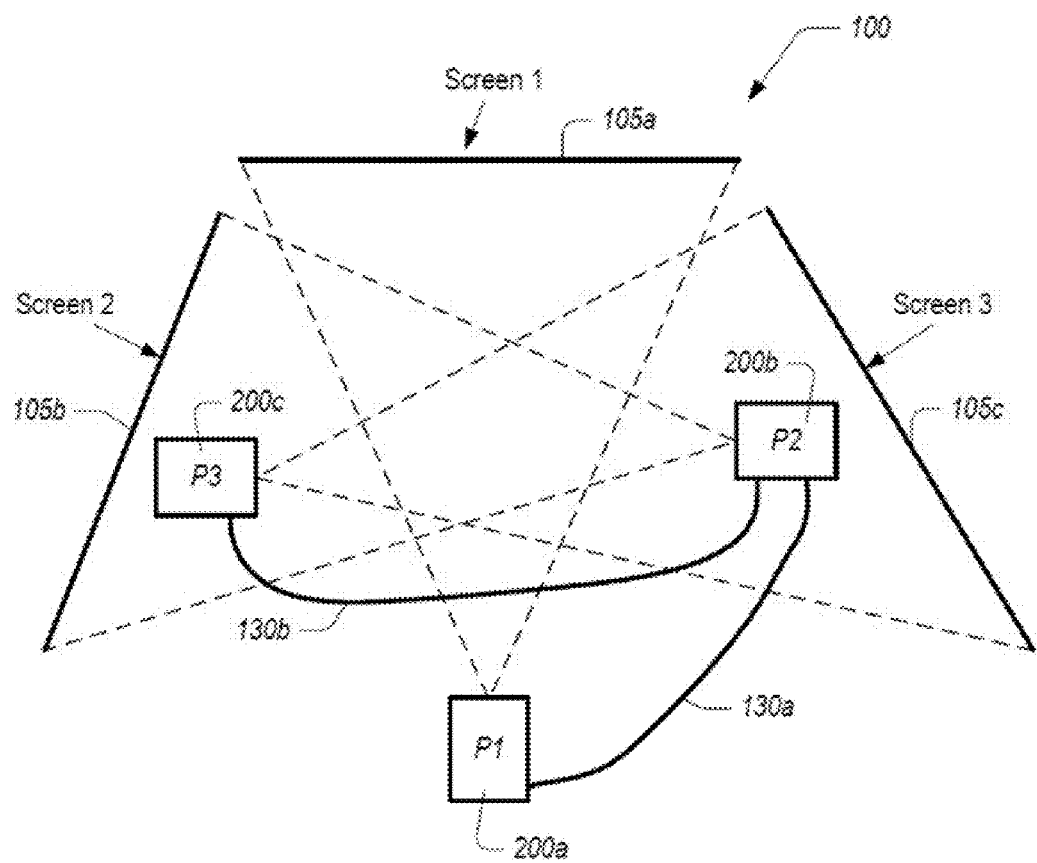
FIG. 2B is an illustration of a projector system for providing an immersive display experience on multiple screens.

FIG. 2B is an illustration of a projector system for providing an immersive display experience on multiple screens. The projector system 200a can be configured to be the master projector system. As used herein, the master projector system or the master media server provides the synchronization signal to which the slave projector systems synchronize their output. The master projector system 200a ingests, decodes, and/or provides the main audiovisual presentation in the immersive display system 100. Projector systems 200b and 200c are slave projector systems. As used herein, a slave projector system or slave media server provides images synchronized to the master system wherein synchronization is based at least in part on the synchronization signal provided by the master projector system. A slave projector system may provide video that is projected peripheral, adjacent, near, and/or otherwise complementary to the video provided by the master system.

The master projector system 200a transmits a synchronization signal over the cabled connection 130a to a first slave projector system (e.g., projector system 200b) that then transmits the same synchronization signal over the cabled connection 130b to a second slave projector system (e.g., projector system 200c). The synchronization signal is the same or substantially the same for all projector systems to enable globally synchronized video in the immersive display system. Accordingly, due at least in part to the projector systems 200a-c projecting video based on the synchronization signal, a synchronized video presentation is provided on the screens 105a-c. As used herein, synchronized video includes video from different projector systems having corresponding frames that are displayed within a sufficiently small time window from one another so as to be displayed substantially simultaneously. In some embodiments, synchronized video includes video wherein corresponding frames are displayed such that a time between the display of the synchronized frames is less than or equal to about 1 ms, less than or equal to about 500 μs, less than or equal to about 350 μs, less than or equal to about 250 μs, or less than or equal to about 200 μs. Such synchronization can be referred to as having sub-frame accuracy in its synchronization. For example, for a video that has a frame rate of 30 fps (or 60 fps), each frame of video is displayed for about 33.3 ms (or 16.7 ms). Videos that are synchronized to within a fraction of the time a video frame is displayed can be said to have sub-frame accuracy. For example, sub-frame accuracy can include synchronization that has a latency between corresponding frames that is less than about 10% of the frame rate, less than about 5% of the frame rate, less than about 1% of the frame rate, or less than about 0.1% of the frame rate.

In some embodiments, the master projector system 200a can control display of a video in units of frames and synchronize the video frames from projector systems 200b and 200c using a time code for each frame. Accordingly, the projector systems 200a-c can accurately synchronize the video projected on screens 105a-c based at least in part on the time code for each frame in the synchronization signal.

As an example, the immersive display system 100 can include Digital Cinema Initiatives (DCI)-compliant projector systems 200a-c configured to play DCI-compliant content inside a movie theater. The DCI-compliant content can include a media stream (e.g., video data or video and audio data extracted from digital content). In some implementations, the media stream is provided as a digital cinema package ("DCP") comprising compressed, encrypted, and packaged data for distribution to movie theaters, for example. The data can include a digital cinema distribution master ("DCDM") comprising the image structure, audio structure, subtitle structure, and the like mapped to data file formats. The data can include picture essence files and audio essence files that make up the audiovisual presentation in the DCP. The DCP can include a composition which includes all of the essence and metadata required for a single digital presentation of a feature, trailer, advertisement, logo, or the like. The projector systems 200a-c can be configured to ingest the DCP and generate a visually indistinguishable copy of the DCDM and then use that copy of the DCDM to generate image and sound for presentation to an audience.

FIG. 2B illustrates 3 projector systems 200a-c and 3 screens 105a-c. However, the immersive display system can include a different number of projector systems and/or screens. For example, the immersive display system 100 can include at least 2, 3, 4, 5, 6, 7, 8, 9, 10, or more than 10 projector systems. The immersive display system 100 can include at least 2, 3, 4, 5, 6, 7, 8, 9, 10, or more than 10 screens. The immersive display system 100 can be configured such that more than one projector system provides video on a single screen, such that the images substantially overlap. The immersive display system 100 can be configured such that projector systems provide video on a single screen wherein the videos from projector systems minimally overlap, are adjacent to one another, or are near one another to provide a substantially unitary video presentation.

Figure 2C:
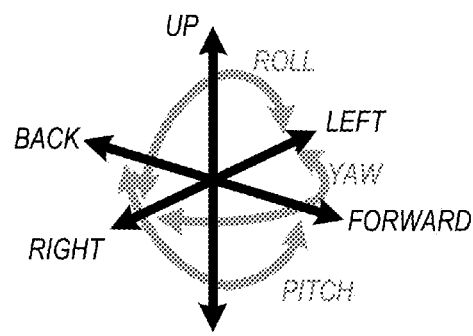
FIG. 2C illustrates example degrees of freedom of movement of a screen, projector, and/or other elements of the movie theater system.

FIG. 2C illustrates example directions of movement of a screen, projector, and/or other elements of the movie theater system. In some embodiments, screens, projectors, and/or other elements of the movie theater system may move in a plurality of the directions: up, down, left, right, back, forward, roll, pitch, and yaw, and/or any combination of those directions. The movement in each of these directions may be dependent or independent of one another. In some embodiments, screens, projectors, and/or other elements of the movie theater system may be moveable in all of the aforementioned directions. As such, they are said to have six degrees of freedom.

Figure 2D:
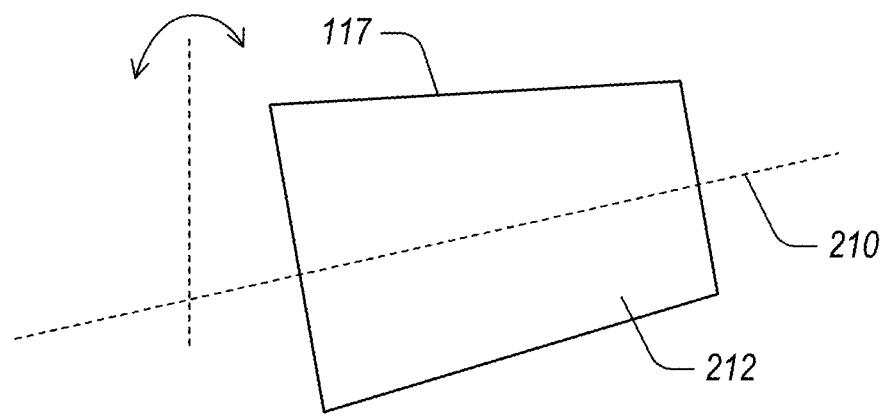
FIG. 2D illustrates rotation of an example side screen.
Figure 2D:
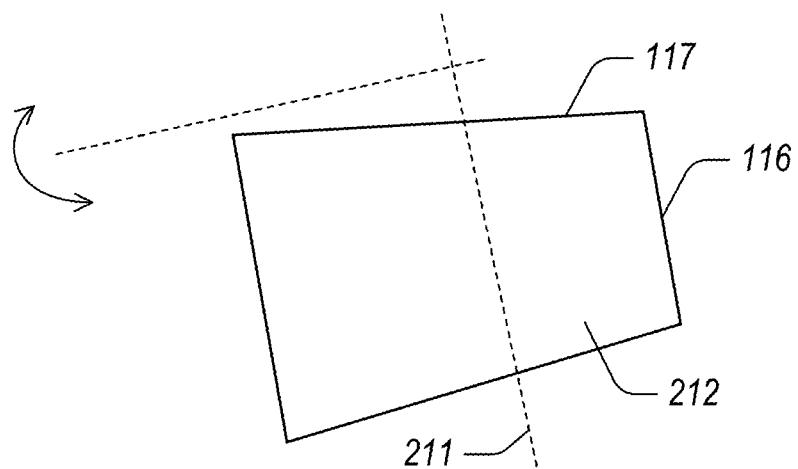

FIG. 2D illustrates rotation of an example side screen. For example, left side screen 212 may rotate about axis 210, which may be a central horizontal axis of rotation. Axis 210 may be located anywhere at or between the bottom edge and the top edge of left side screen 212, depending upon the desired tilt characteristics. For example, the horizontal axis of rotation may be located within the lower one-third, middle one-third, or top one-third of the vertical height of the screen. Rotation of the screen about the horizontal axis allows the top edge 117 of the screen to be extended (tilted) towards or away from the audience.

Axis 211 may be a central vertical axis of rotation, where left side screen 212 may rotate about axis 211 to bring the front edge 116 towards or away from the midline of the theater. Axis 211 may also be located anywhere at or between the front and rear edges of left side screen 212, such as within the forward one-third, middle one-third or rear one-third of the horizontal length of the screen. Other axes of rotation may be disposed at any angle between vertical and horizontal.

A front screen and/or a continuous screen may have analogous axes of rotation, where a horizontal axis of rotation may be located anywhere between its bottom edge and top edge, and a vertical axis of rotation may be located anywhere between its right edge and left edge. Other axes of rotation may also be disposed at any angle between vertical and horizontal.

Figure 2E:
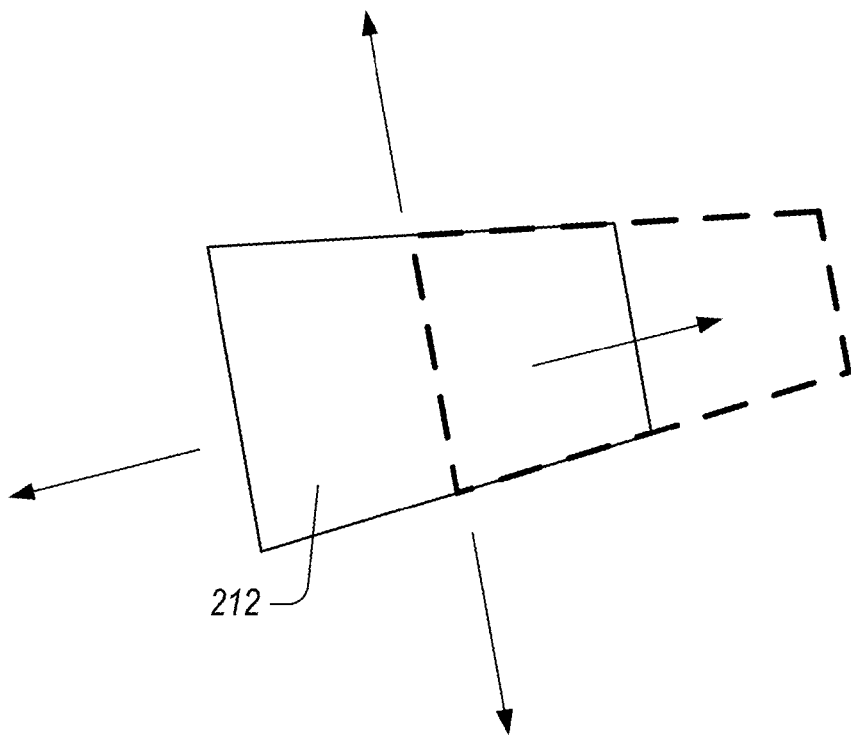
FIG. 2E illustrates in plane translation of an example side screen.

FIG. 2E illustrates in plane translation of an example side screen. Side screen 212 may translate in plane in the directions of up, down, forward, and rear. A front screen or continuous screen may analogously translate in plane in the directions left, right, up and down.

Figure 2F:
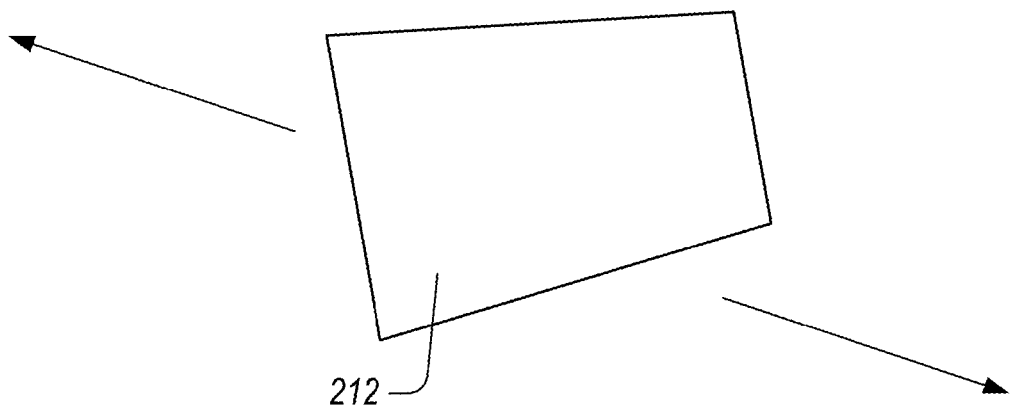
FIG. 2F illustrates whole plan translation of an example side screen.

FIG. 2F illustrates translation of an example side screen in a direction perpendicular to the plane of the screen. Left side screen 212 may translate whole-plane towards or away from the audience. A front screen and/or continuous screen may analogously translate whole plane towards or away from the audience.

Figure 3:
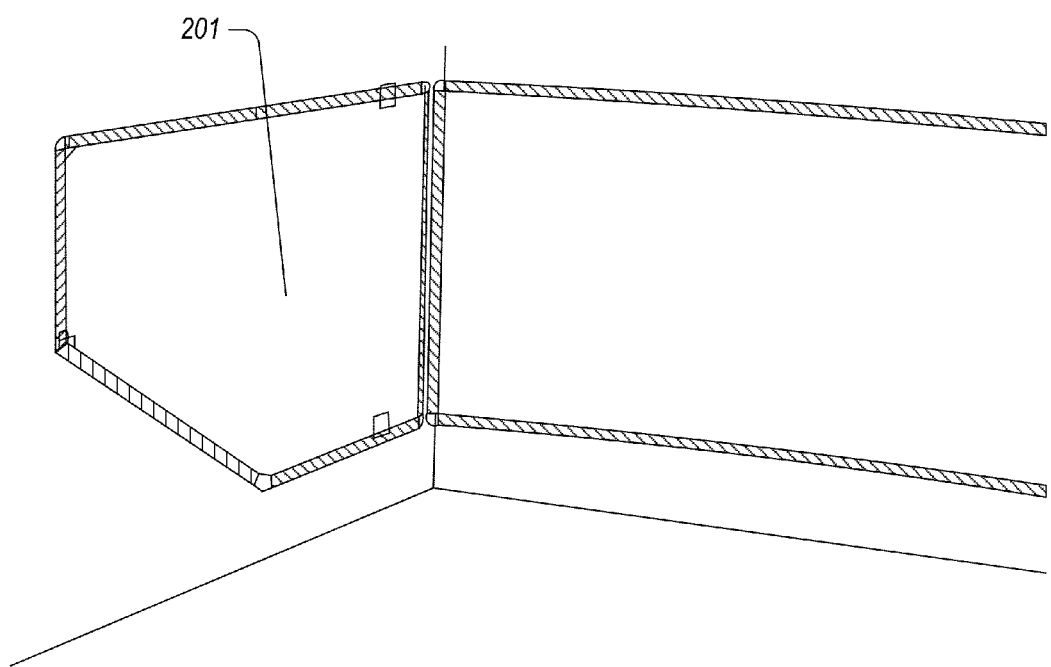
FIG. 3 is a graphical representation of an example left side screen in a trapezoidal frame.

FIG. 3 is a graphical representation of an example side screen in a trapezoidal frame. Typically, front movie screens are rectangular in profile, substantially planar or concave towards the audience, and vary in aspect ratio (e.g., the width of the screen divided by the height). The aspect ratios often vary between 1.33 and 2.69. In certain cinema environments, part of a screen may interfere with environmental factors, such as stairwells, stage elements, and/or other structures of a venue. This may be especially true when the screens are capable of moving as will be described in this disclosure. Accordingly, screens (including front screens, side screens, and/or continuous screens such as screen 115 (FIG. 1C)) may have the shape of a trapezoid, triangle, rhombus, circle, ellipse, and/or any standard or non-standard shape as desirable.

For example, screen 201 is a left side screen that is trapezoidal in shape. As illustrated, the bottom-left corner has been removed such as to accommodate seating, stairs, and/or line of sight considerations; however, the top-left corner and/or any of the other corners may also be removed in addition or in the alternative.

Having screens in various shapes may also be desirable to create a more immersive experience. For example, having screens in different shapes may allow screens to be placed in positions in which rectangular screens may not be placed, such as tucked in the corner of a slanted ceiling and/or along the steps of a stairwell. The screen shapes may also enhance viewing experiences by giving the audience novel views of the presentation.

In some situations, it may also be desirable to have screens that can be repositioned either between a storage configuration and a display configuration, or between two or three or more configurations before, after, and/or during the course of a single movie. For example, for continuous screen applications, such as those involving screen 115 (FIG. 1C), movement of the screen or portions of the screen may be desirable in certain applications in order to give the audience the content creator's desired viewing angle for a given scene and/or to further immerse the audience. For example, when screen 115 is used to show a chase scene in a movie, it may be desirable to move screen 115 side-to-side and/or up-and-down, optionally in synchronization with displayed content, to accentuate the frantic nature of the chase.

It may also be desirable to move the screen for architectural reasons. For example, a screen may be moved to provide more exits or conceal or reveal other architectural features. Also, it may be desirable to move the screen to improve viewing angles for larger crowds versus smaller crowds. For example, in FIG. 1B, the optimal screen positions may be different for a crowd that only fills immersion zone 113 than for a crowd that fills immersion zone 113 and/or viewing zone 114. The screens may therefore be moveable between a first configuration for a viewing audience of fewer than a predetermined threshold (e.g., side screens advanced medially and optionally front screen advanced rearwardly to reduce the size of the immersion zone), and a second configuration for a viewing audience of a size that is greater than the threshold. The viewing characteristics of the theater can thus be changed (optimized) to correspond to the size of a given viewing audience.

Similarly, for multi-screen applications, movement of one or more screens may be desirable to prevent interfering with other items in the cinema, to avoid hindering egress access, and to improve the movie-going experience. Side screens may also be moved in order to lock them into positions for optimized viewing of cinema presentations depending on the positioning of the audience. The side and/or front screens may also be synchronized with metadata cues in cinema content, projectors, and/or servers. For example, in some scenes the side screens may be moved rearwardly to be behind at least a portion of the audience, whereas in other scenes, the side screens are moved forward to be on the right and left sides of the audience and adjacent to the front screen. In some cases, one or more of the screens may be positioned before, during, and/or after a cinema presentation.

Figure 4:
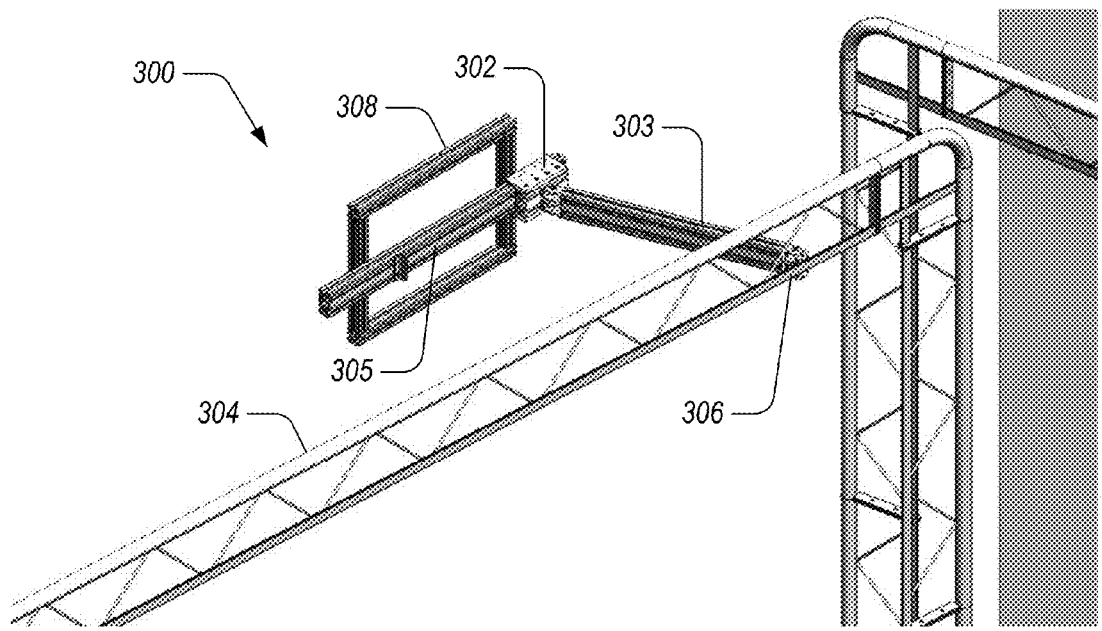
FIG. 4 is an illustration of an example adjustable screen bracket in an extended position.

Any of a variety of adjustable screen mounting brackets may be used to change the angle of a screen. FIG. 4 is an illustration of an example screen bracket in a medially (towards the mid line of the theater) extended position. Bracket 300 has a base 308 for connection to a structure, such as a theater wall, beam, truss, bar, rod, pole, plank, plate, screen, another frame, and/or any architectural and/or structural piece of a venue. Arm 303 connects base 308 to frame 304 using joint 306. First arm 303 is connected to second arm 305 using joint 302.

Joints 306 and 302 may be hinges that allows arms 303 and 305, respectively, to swing with angular motion. Joints 306 and 302 may also be joints that allow arms 303 and 305, respectively, to swing and/or slide in multiple directions, including left, right, back, forward, up, down, roll, pitch, and yaw, and/or any combination of those directions. Joints 306 and 302 may also be coupled to one or more actuators that facilitate the movement of the joints.

Joints 306 and 302 may be controlled independently and/or be configured to move screens in different ways. For example, joint 306 may enable fine changes to the angle of a screen, such as by elongation or shortening along the longitudinal axis of arm 303. Joint 302 may comprise a bracket that is movable along a track or arm 305, such that it can advance the screen in a forward or rear direction.

In an alternate construction, joint 306 is a pivotable joint and rearward movement of joint 302 such as by rearward movement along the track or arm 305 will retract joint 306 and associated screen in a lateral direction.

Arms 303 and 305 may comprise any of a variety of tracks trusses, beams, bars, poles, telescopic rods, hydraulic jacks, prismatic joints, pneumatic cylinders, screws, springs, and/ or any support structure known in the art. In some embodiments, the length of arms 303 and 305 may be adjusted by rotational movement of 2 components (e.g., threaded engagement), turning, telescopic pulling, pushing, bending, and/or any other means of manipulation. Arms 303 and 305 may be coupled to actuators that can make the adjustments.

Base 308 may also comprise any of a variety of trusses, bars, beams, poles, plates, chassis, and/or other support structure known in the art, depending upon whether base 308 is intended to be secured to a wall, free standing support, or other structure.

Frame 304 may be connected to and/or house a viewing screen. Frame 304 may comprise trusses, beams, bars, rods, poles, and/or other support structure and/or housing known in the art for supporting a viewing screen.

Figure 5:
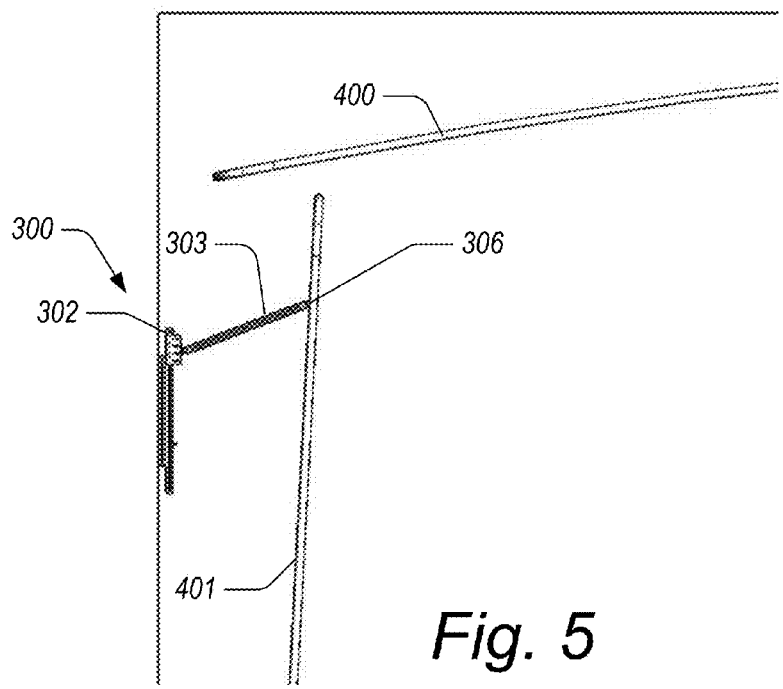
FIG. 5 is a top plan view of an adjustable screen bracket when it is in an extended position.

In the extended (e.g., open) position, bracket 300 allows a screen to be positioned a distance away from base 308. In some cases, the extended position places frame 304 closer to the audience. FIG. 5 is a top plan view of the screen mounting bracket of FIG. 4 when it is in an extended position, joint 302 has been advanced along arm 305 in a forward direction, causing lever arm 303 to advance at least the upper forward edge of left side screen 401 in a medial direction, closer to the audience. In some cases, advancing the forward edge of left side screen 401 medially to the limit of travel may cause some overlap between the upper portion of left side screen 401 and front screen 400, which may be the main-viewing screen. In an extended position, bracket 300 is extended such that left side screen 401 is positioned farther out, closer to the audience. Also, in some cases, positioning screen 401 in the extended position may cause some overlap between left side screen 401 and front screen 400.

As will be appreciated by those of skill in the art, each of the three or more screens may be moved in any of a variety of directions depending upon the content creator's intention. Movement of the left and right side screens will normally be accomplished with bilateral symmetry, however this is not necessarily the case. Either or both of the side screens may be moved such that the upper edges advance medially more than the lower edges, thereby tilting the screens downwardly towards the audience. The side screens may alternatively be tilted upwardly with respect to the audience. Alternatively, the forward edges of the screens may be advanced medially or laterally, without any upward or downward tilt. Similarly, the rearward edges of the side screens maybe advanced medially or laterally, with or without upward or downward tilt. The front screen may be tilted upwardly or downwardly with respect to the audience, and maybe tilted to the right or the left if desired. Any one or a combination of the foregoing movements, among others, maybe accomplished prior to the commencement of video playback, as a pre-showing set up. Alternatively, any one or a combination of the foregoing movements, among others, may be accomplished during the course of playback, in cooperation with content, to achieve a desired effect. Following completion of the movie playback, the screens may be returned to a preset ready to play, or storage configuration. Any one or a combination of the foregoing movements, among others, may be accomplished after completion of movie playback to achieve a desired effect.

Figure 6:
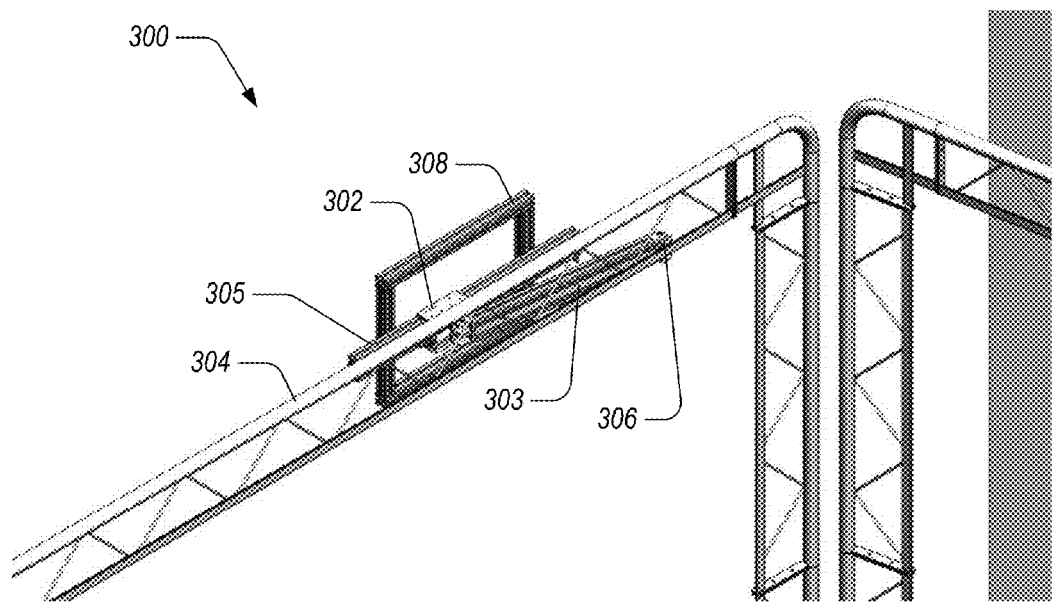
FIG. 6 is an illustration of an adjustable screen bracket when it is in a retracted position.
Figure 7:
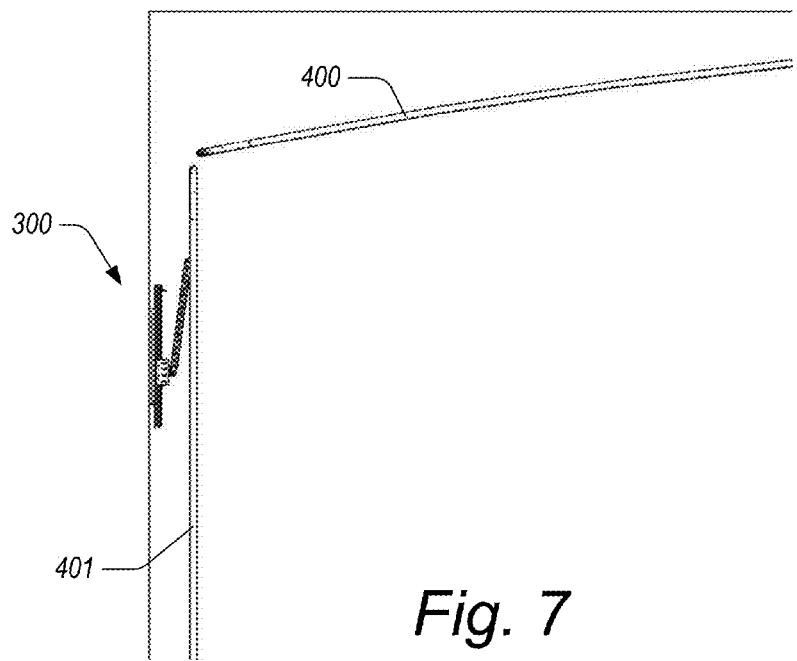
FIG. 7 is a top plan view of a screen bracket when it is in a retracted position.

FIGS. 6 and 7 illustrate an example screen bracket when it in a retracted position. In the retracted (e.g., closed) position, bracket 300 is collapsed by sliding joint 302 along arm 305 in a rear direction such that left side screen 401 is retracted farther away from the audience. Left side screen 401 has also moved laterally from when bracket 300 was in an extended position. Noticeably, there is less overlap between left side screen 401 and front screen 400 than when bracket 300 was in an extended position (e.g., FIG. 5). It should be noted that left side screen 401 may be moved to positions different and/or intermediate to the positions illustrated in FIG. 5 and FIG. 7. For example, bracket 300 may be moved such that left side screen 401 is in a position halfway between its extended and retracted positions. In this way, left side screen 401 may be positioned as desired.

It should be recognized that bracket 300 may be positioned at various locations and angles on left side screen 401 in order to turn left side screen 401 in different directions. For example, bracket 300 may be positioned vertically along the middle of left side screen 401 such that when bracket 300 is an extended position, left side screen 401 is tilted with its top edge towards the audience and its bottom edge away from the audience. Bracket 300 may also be positioned off-center to further cause some angular motion of left side screen 401.

Figure 8A:
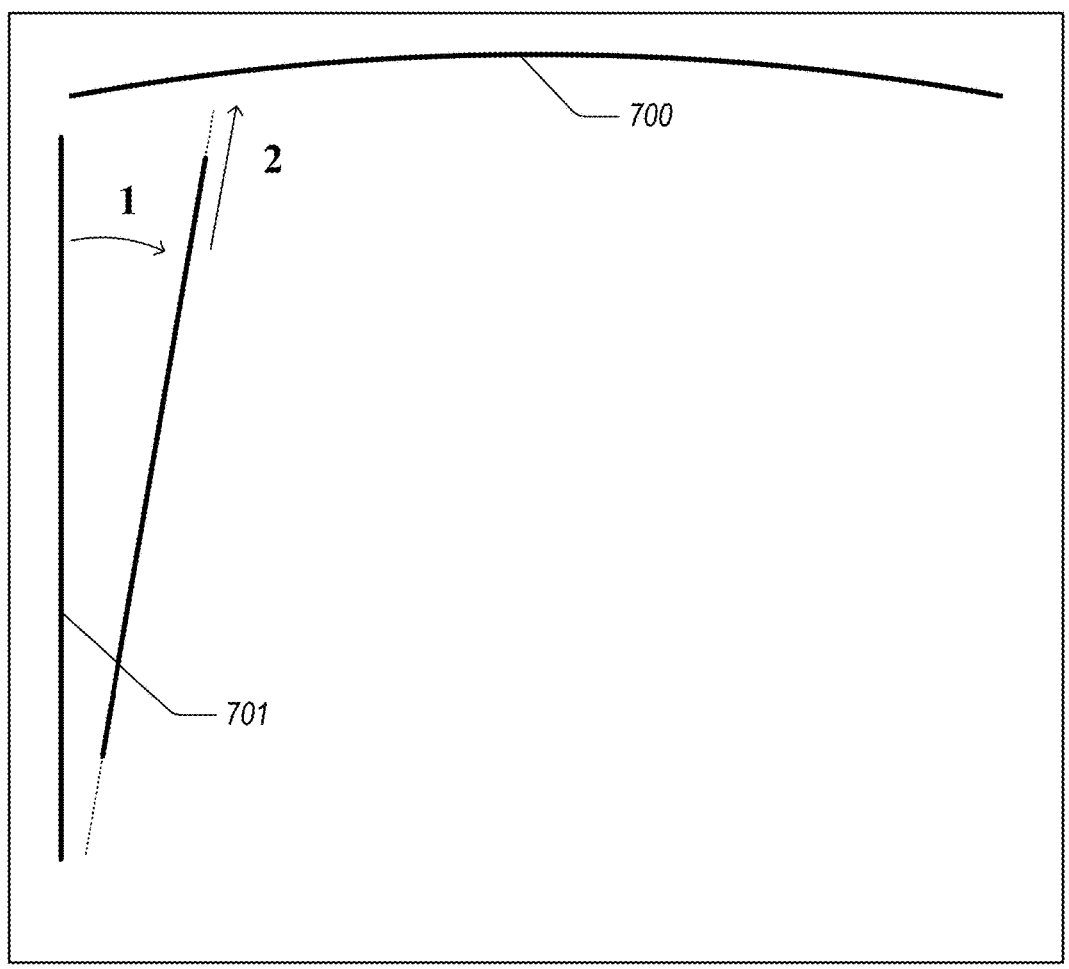
FIG. 8A is an illustration showing a two-part side screen movement system where a left side screen is angled inwards and then slid forward.

FIG. 8A is an illustration showing a two-part side screen movement system where a side screen is angled inwards and then slid forward. Left side screen 701 may first tilt inwards in motion 1. In some embodiments, motion 1 may be performed by bracket 300 (FIG. 5), where bracket 300 moves from a retracted position to an extended position. It may also be performed by other systems described in this disclosure. Motion 2 slides screen 701 towards screen 700.

This may be performed by actuating joint 302 and/or extending arm 305 (FIG. 4). It may also be performed by sliding joint 302 along arm 305 (FIG. 4), or by other systems described in this disclosure.

Figure 8B:
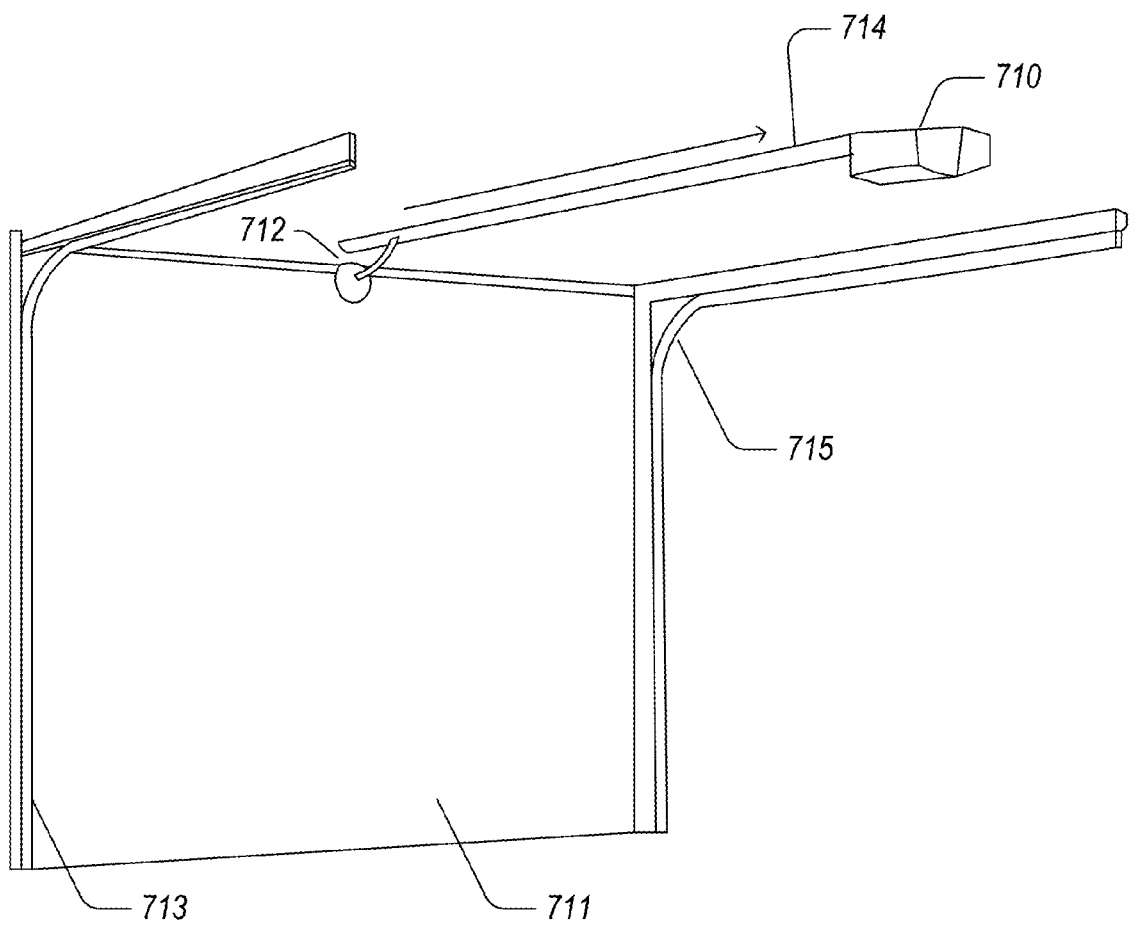
FIG. 8B is an illustration of an example screen that can move onto a ceiling.

FIG. 8B is an illustration of an example screen that can move onto a ceiling. Screen 711 is connected to side rails 713 and 715. Screen 711 is also connected to ceiling rail 714 and coupled to actuator 710. In some embodiments, actuator 710 may be a motor that connects to a chain and/or belt that pulls screen 711 along ceiling rail 714. The movement of actuator 710 changes the angle of screen 711 and may position screen 711 partially on the ceiling and/or fully on the ceiling. In some cases, such movement may be used to improve the viewing angle and/or viewing experience of the audience. In other cases, screen 711 may be moved to the ceiling for storage and/or to drop down at certain times (e.g., in response to metadata cues in cinema content, projectors, and/or servers). Actuator 710 may also move screen 711 back down into a position along a wall. For example, screen 711 may come down in response to certain metadata cues in cinema content, projectors, and/or servers. In some embodiments, screen 711 may be part of a multi-screen cinema environment (e.g., left side screen 111 from FIG. 1A) and/or a continuous screen (e.g., screen 115 from FIG. 1C).

Figure 8C:
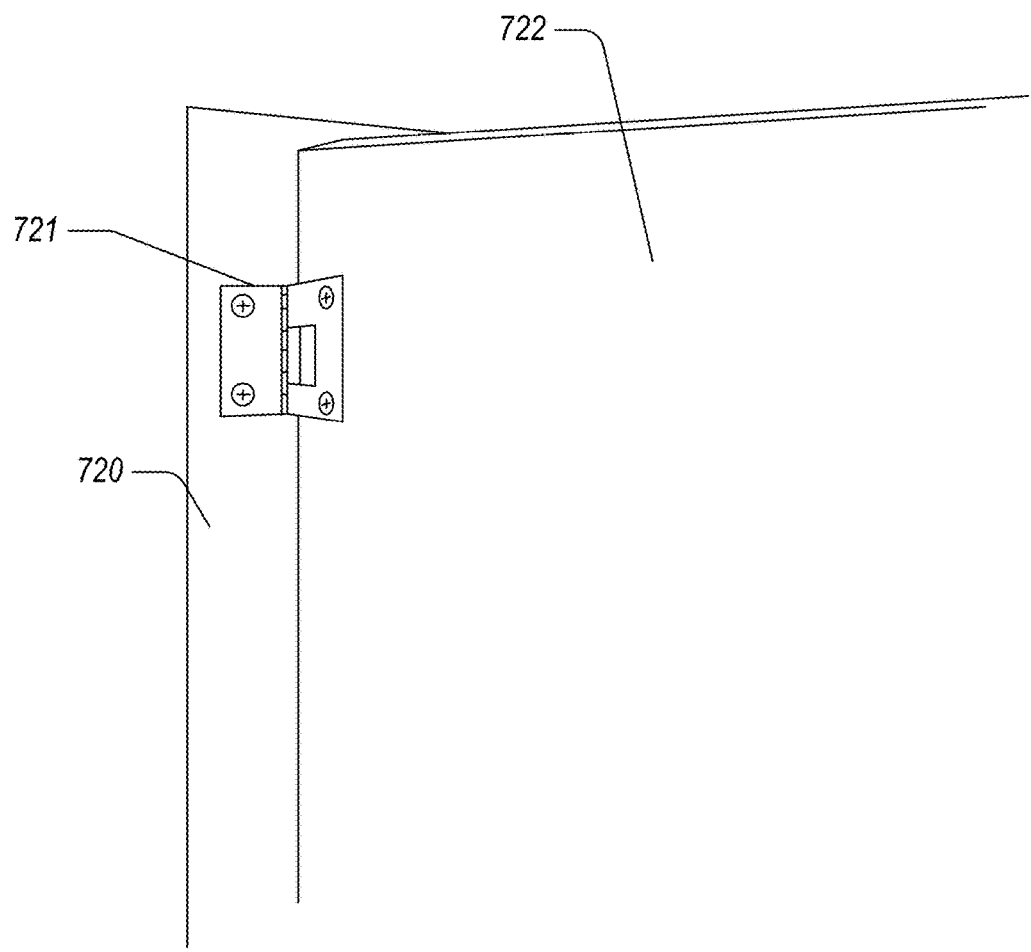
FIG. 8C illustrates a screen that pivots about a hinge.

FIG. 8C illustrates a screen that pivots about a hinge. Hinge 721 allows screen 722 to swing. Hinge 721 may also be attached to structure 720, which may be a wall, beam, truss, bar, rod, pole, plank, plate, another screen and/or frame. It may also be any architectural and/or structural piece of a venue. One or more hinges like hinge 721 may be attached to screen 722, allowing it to swing along any of its edges. For example, screen 722 may swing horizontally and/or vertically. Screen 722 may partially swing to change the viewing angle for the audience, or it may swing completely to hide away or appear at certain times. Hinge 721 may be coupled to an actuator that can move screen 722 to rotate around hinge 721.

Figure 9:
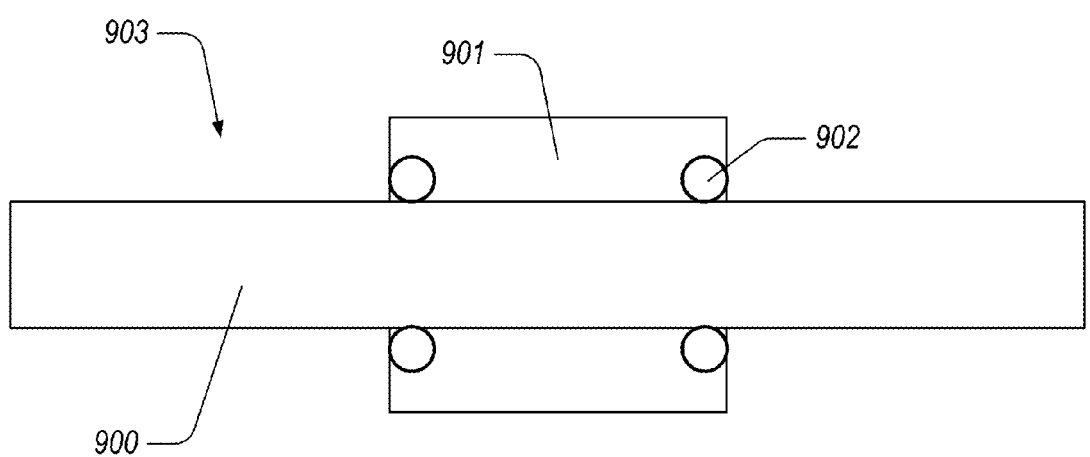
FIG. 9 illustrates an example rail system for sliding a screen, projector, and/or any element of the movie theater system.

FIG. 9 illustrates an example rail system for sliding a screen, projector, and/or any element of the movie theater system. Rail system 903 includes rail element 900, which is a structural member that can guide an element of the movie theater system to a location. It may be one or more beams, bars, trusses, etc., and/or any structural elements that can be used as a rail. It may be made out of any material or combination of materials, including one or more of metals, polymers, wood, and/or ceramics. In some embodiments, rail element 900 is located overhead, above the screens, projectors, and/or other elements of the movie theater system. In other embodiments, rail element 900 may be located on the floor of the auditorium and/or viewing venue. Rail element 900 may also be located anywhere between the floor and overhead. It may also be located on a wall. Rail element 900 may be connected to a plurality of rail elements, like rail element 900, configured to guide screens, projectors, and/or elements of a movie theater system. For example, the rail elements may be configured to slide a continuous screen (e.g., screen 115 of FIG. 1C) vertically to various positions between the floor and the ceiling.

Rail system 903 also includes connector 901, which connects the screens, projectors, and/or other element of a movie theater system to rail element 900. Connector 901 may comprise of a plate, beam, bar, truss, etc., and/or any structural element that can be used to support a screen, projector, and/or other elements of a movie theater system. Connector 901 may be made out of any material, and/or combination of materials, including one or more of metals, polymers, wood, and/or ceramics. Connector 901 may be coupled to rail 900 by wheels, such as wheel 902. Wheel 902 may be a roller, ball, wheel, and/or bearing including a ball bearing, roller bearing, ball thrust bearing, roller thrust bearing, tapered roller bearing, magnetic bearings, etc. It may be made out of any material, and/or combination of materials, including one or more of metals, polymers, wood, and/or ceramics.

Connector 901 may also be coupled to an actuator. In some embodiments, rail system 903 may be further modified to be a magnetic rail system wherein connector 901 moves along rail element 900 using magnets instead of wheels.

Figure 10A:
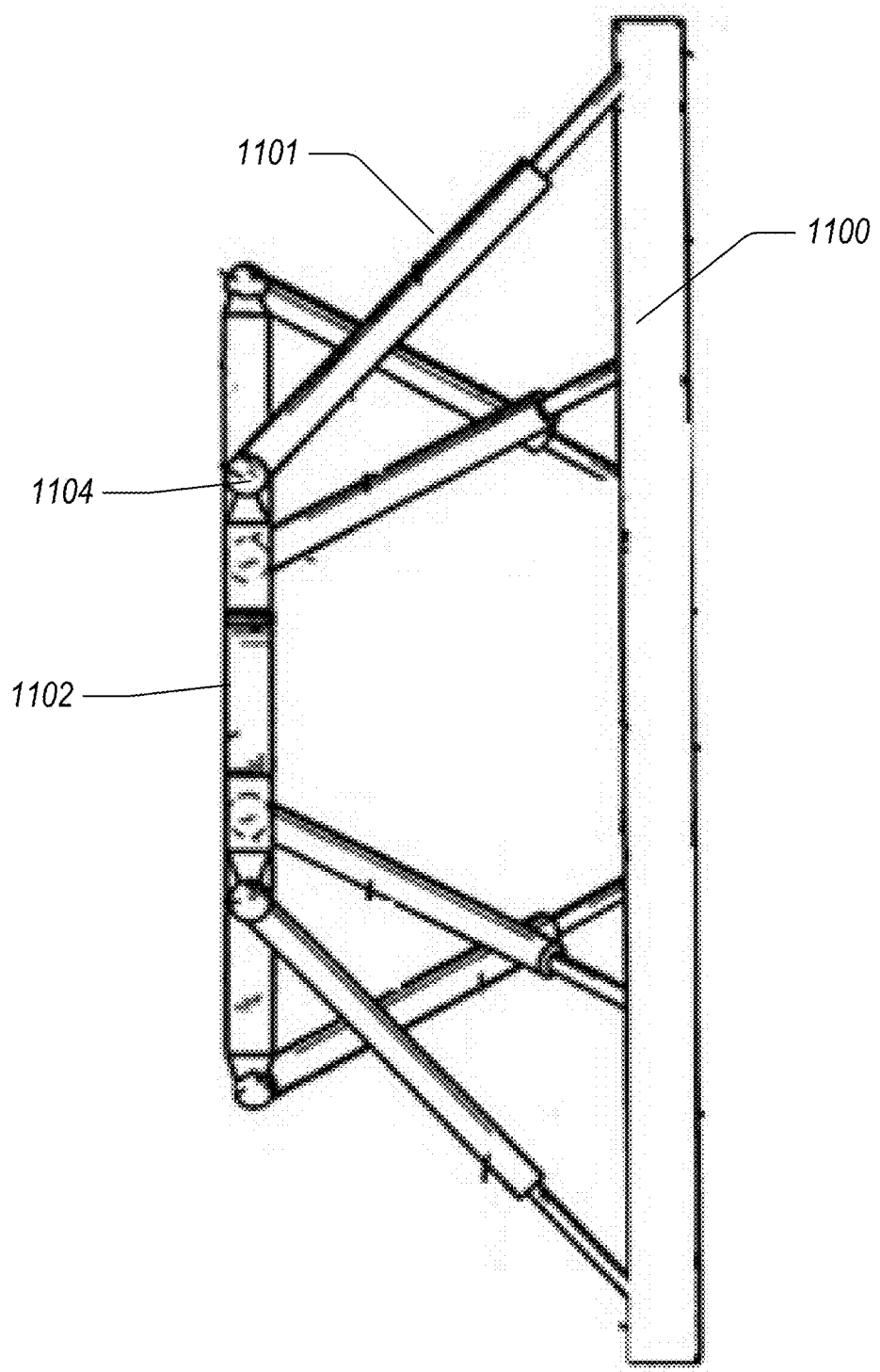
FIG. 10A illustrates an example actuator system that can move a screen in multiple directions using length-adjustable elements connected to the screen at various places.

FIG. 10A illustrates an example actuator system that can move a screen in multiple directions using a length-adjustable element connected to the screen at various places. The actuator system may be used in conjunction with any of the systems described in this disclosure. Bracket 1102 connects to another bracket or structure (e.g., a wall, connector 901 (FIG. 9), joint 306 (FIG. 4), etc.). Element 1100 may be a screen and/or a support structure for a screen (e.g., a backing or a frame). Bracket 1102 is connected to element 1100 using a plurality of length-adjustable elements such as length-adjustable element 1101. Length-adjustable element 1101 may comprise telescopic rods, hydraulic jacks, prismatic joints, pneumatic cylinders, screws, springs, etc. It may be coupled to an actuator to lengthen and/or shorten it. Length-adjustable element 1101 may connect to bracket 1102 by a joint 1104 to allow length-adjustable element 1101 to rotate. Similarly, length-adjustable element 1101 may be connected to element 1100 with a joint (not pictured) and/or any other connective element that allows length-adjustable element 1101 to rotate about its connection to element 1100. Joint 1104 and/or any other joint may be connected to an actuator, which may drive the rotation of length-adjustable element 1101. There may be a plurality of length-adjustable elements like length-adjustable element 1101, which when lengthened and/or shortened in concert, may move element 1100 in a plurality of the directions illustrated in FIG. 2C. For example, element 1100 may have six degrees of freedom.

The length-adjustable elements may also be connected to element 1100 in certain formations to allow for movement in a desired direction. For example, a length-adjustable element connected to the top-middle of element 1100 and the bottom-middle of element 1100 would allow element 1100 to move in the pitch direction. In some embodiments, the length-adjustable elements may be arranged in a hexapod, or a six-jack layout such as a Stewart/Gough platform. The coordination and/or actuation of the length-adjustable elements may be controlled by processor/controller 801 (FIG. 2A). In some embodiments, bracket 1102 may also be coupled to a screen bracket (e.g., bracket 300 in FIG. 4) for further medial and lateral movement.

Figure 10B:
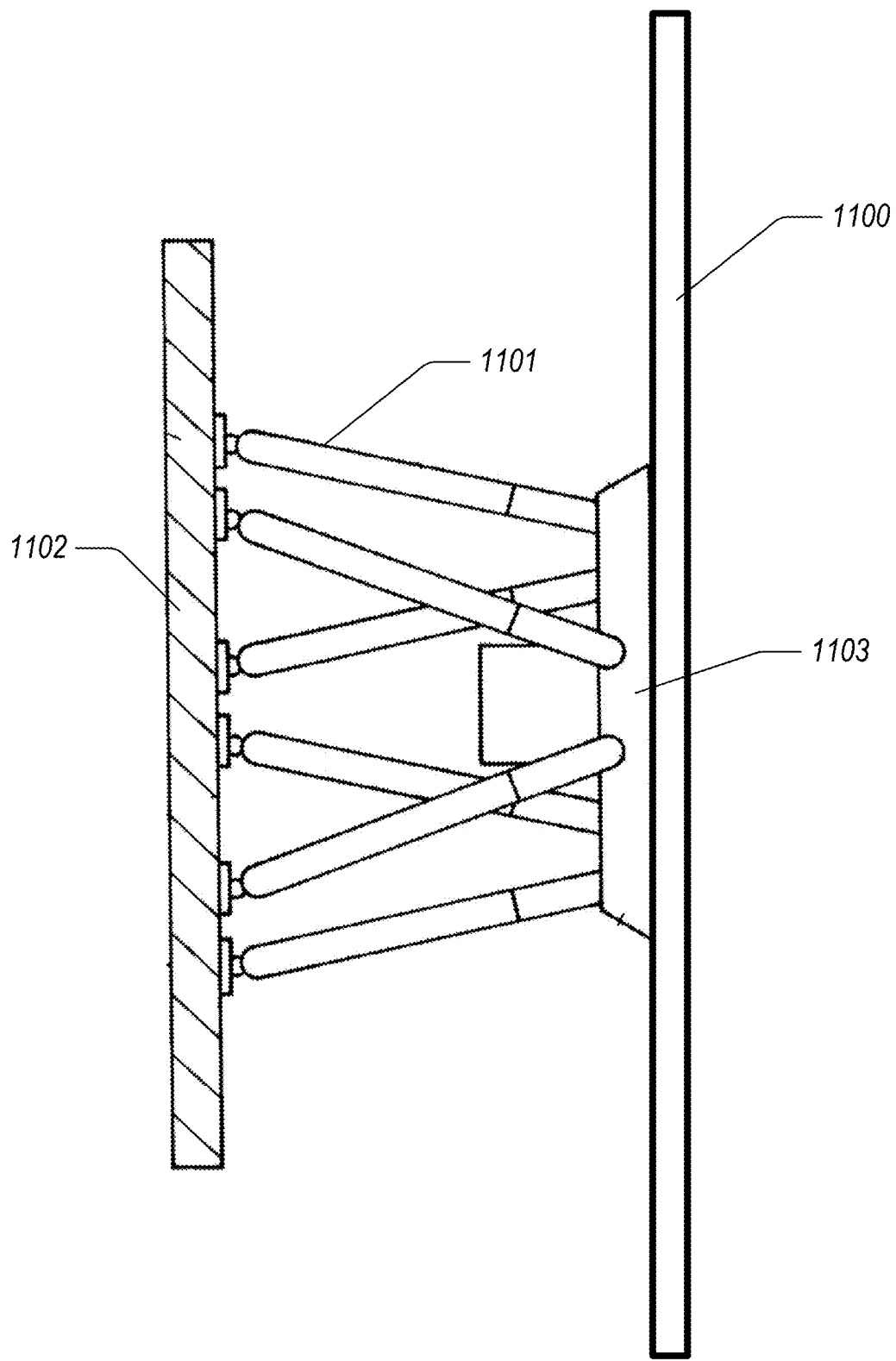
FIG. 10B illustrates an example actuator system that can move a screen in multiple directions using length-adjustable elements connected to a base that is connected to the screen.

FIG. 10B illustrates an example actuator system that can move a screen in multiple directions using length-adjustable elements connected to a base that is connected to the screen. The illustrated system is similar to the system illustrated in FIG. 11 with similar and/or analogous components. For example, it has a plurality of length-adjustable elements such as length-adjustable element 1101. It also has bracket 1102 and element 1100. The length-adjustable elements may be attached to a centralized mounting piece 1103, which is attached to element 1100. In some embodiments, such a configuration may be desirable for quicker angular motion.

Figure 11:
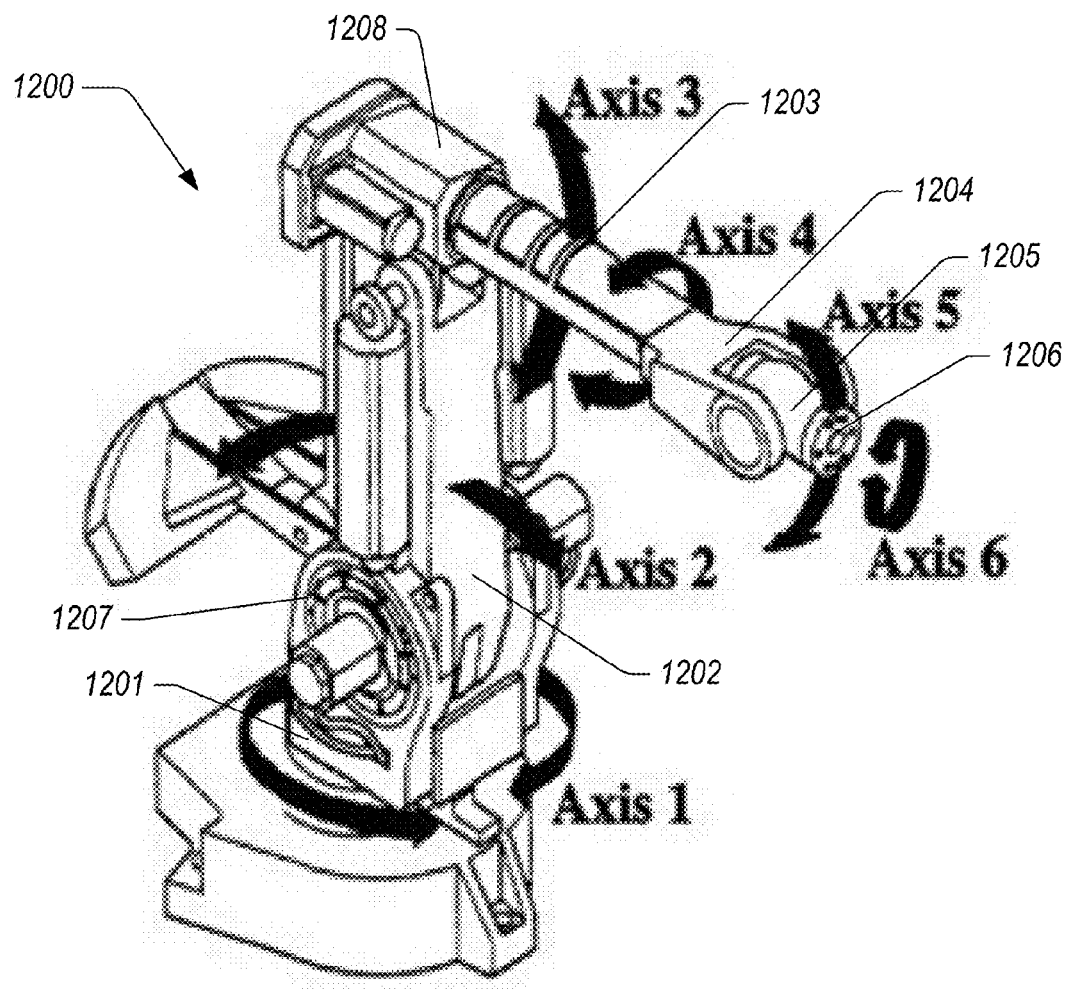
FIG. 11 shows an example poly-axial articulating arm that can be used to move a screen in a plurality of directions.

FIG. 11 shows an example arm that can be used to move a screen in a plurality of directions. Arm 1200 comprises of member parts 1201, 1202, 1203, 1204, 1205, and 1206. Each of the member parts may be coupled to one or more actuators, which may move each of member parts 1201, 1202, 1203, 1204, 1205, and 1206 in one or more directions. For example, member part 1201 may be connected to a base through an actuator, which may rotate member part 1201 along axis 1 in the yaw direction. Member part 1201 may be connected to member part 1202 through actuator 1207, which may move member part 1202 along axis 2 in the forward and back directions. Member part 1202 may be connected to member part 1203 through joint actuator 1208, which may move member part 1203 along axis 3 in the up and down direction. Member part 1203 is connected to member part 1204 through an actuator, which may move member part 1204 along axis 4 in the roll direction. Member part 1204 may be further connected to member part 1205 through an actuator, which may move member part 1205 along axis 5 in the pitch direction. Member part 1205 may connect to member part 1206 through an actuator, which may move member part 1206 along axis 6 in the roll direction. Member part 1205 may also connect to a screen, projector, and/or any element of a movie theater system.

It should be recognized that by moving member parts along their axes of movement, a number of directions of movement may be achieved. For example, by rotating member part 1201 along axis 1, and moving component 1202 along axis 2, arm 1200 may be moved in the left and right direction.

Figure 12:
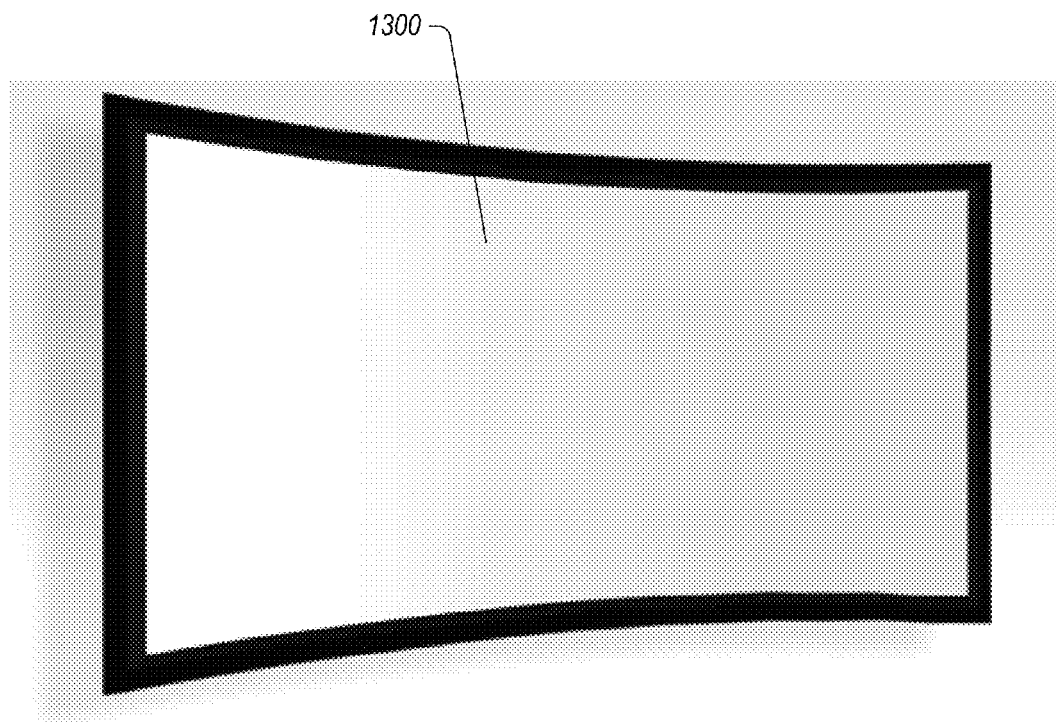
FIG. 12 illustrates an example of a screen which is curved along its horizontal axis.

FIG. 12 illustrates an example curved screen. Screen 1300 is curved such that not all portions of screen 1300 are in the same plane. Screen 1300 may be symmetrically curved as pictured, and/or portions of screen 1300 may be asymmetrically curved as desired. In some applications, it may be desired to curve parts of screen 1300 and leave other parts flat. For example, the upper-left corner of screen 1300 may be bent inwards while the rest of screen 1300 is left flat. A person having ordinary skill in the art should appreciate that the technologies of this disclosure may be applied to any part or sub-part of screen 1300 in order to formulate different screen shapes. In some cases, screen 1300 may be statically curved and/or curved dynamically. In embodiments with dynamically curved screens, the screen may comprise of pliable and/or flexible parts. For example, the screen may comprise of metals, rubbers, foams, wood, and/or other bendable materials. The screen may be curved (statically or dynamically) in the horizontal and/or vertical directions. Deviations in both horizontal and vertical directions could produce a toroidal image surface or a spherical image surface, depending on whether the radius of curvature in the horizontal and vertical are the same. There may also be non-constant radius curvature (e.g., elliptical) along one or more axes. Other example screens can have surfaces that are, for example and without limitation, spherical, toroidal, and elliptical.

Screen 1300 may be curved dynamically by the system illustrated in FIG. 10A, where some of the length-adjustable elements are lengthened and/or shortened, and element 1100 is pliable such that some portions actuate at a time while other portions do not. Screen 1300 may also be curved by a plurality of arms such as arm 1200 (FIG. 11), applied to different parts of screen 1300. Screen 1300 may also be curved by any other means described in this disclosure and/or known in the art.

Figure 13A:
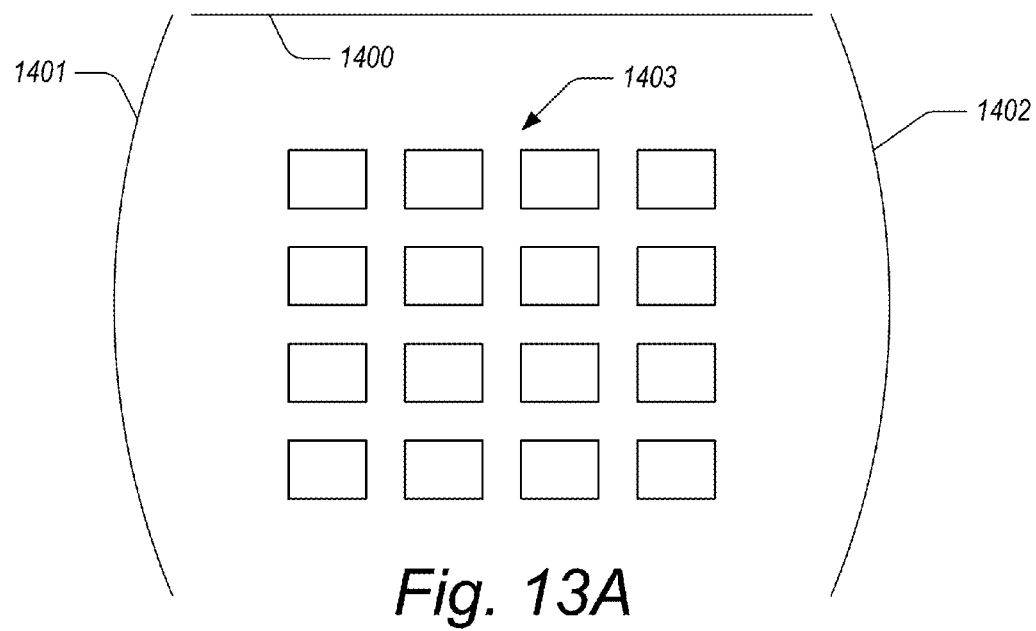
FIG. 13A illustrates an example immersive theater environment using multiple screens, where the left side screen and right side screen are curved.

FIG. 13A illustrates an example immersive theater environment using multiple screens, where the side screens are curved. For example, left side screen 1401 and right side 1402 are curved around the audience in immersion zone 1403. Combined with front screen 1400, left side screen 1401 and right side screen 1402 create an immersive experience for the audience in immersion zone 1403, who may be seated such that left side screen 1401 and right side screen 1402 cover all of their periphery vision. Additional screens may also be placed on the ceiling and/or floor to further create an immersive experience.

Figure 13B:
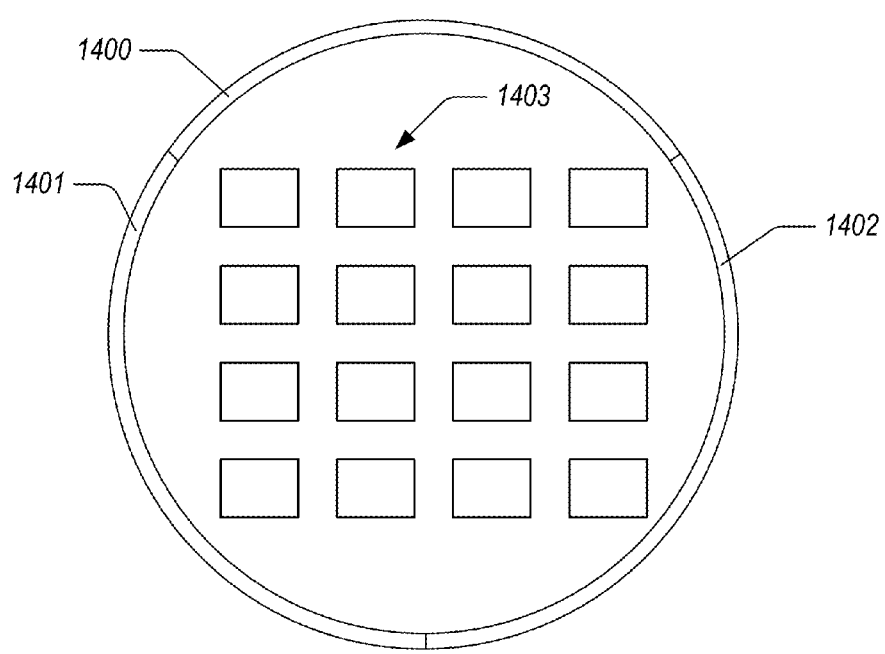
FIG. 13B illustrates an example immersive theater environment using multiple screens, where all the screens are curved in order to surround the audience.

FIG. 13B illustrates an example immersive theater environment using multiple screens, where all the screens are curved in order to surround the audience. In some embodiments, front screen 1400 may be curved as well as left side screen 1401 and right side screen 1402. Left side screen 1401 and right side screen 1402 may curve such that they connect and/or come in close proximity to each other. As such, they may form a circle and/or an elliptical shape around immersion zone 1403. Additional screens may also be placed on the ceiling and/or floor to further create an immersive experience. In some embodiments, left side screen 1401 and/or right side screen 1402 and/or front screen 1400 may be curved to join above or below immersion zone 1403.

Figure 14:
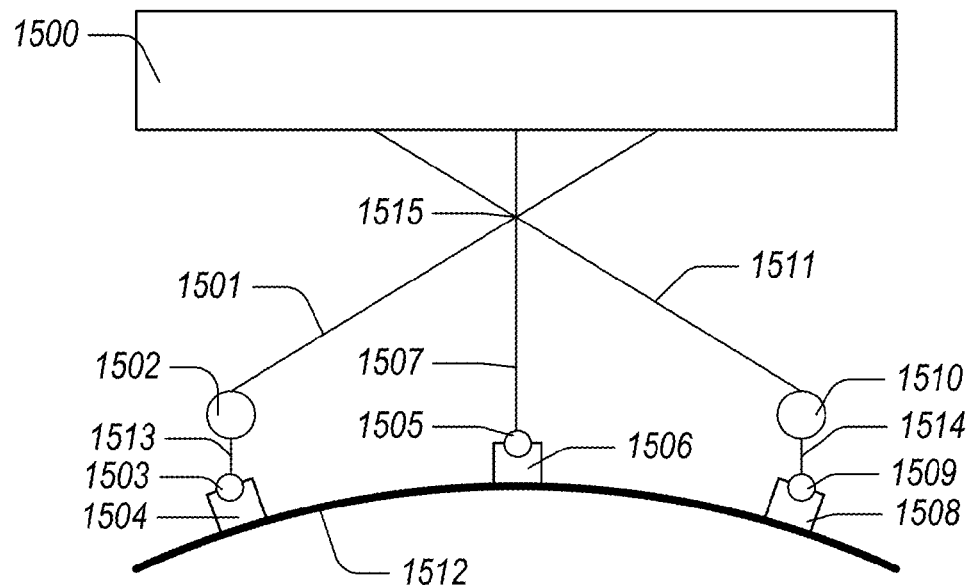
FIG. 14 illustrates an example actuator system having multiple levers used to dynamically curve a screen.

FIG. 14 illustrates an example actuator system having multiple levers used to dynamically curve a screen. Screen 1512 is coupled to mounts 1504, 1506, and 1508. Each of the mounts are coupled to joints 1503, 1505, and 1509, respectively, which may allow some flexion of mounts 1504, 1506, and 1508. Joints 1503 and 1509 may be connected to elements 1513 and 1514, respectively, which may be beams, bars, trusses, etc. and/or any structural element known in the art. Elements 1513 and 1514 may then connect to joints 1502 and 1510, respectively. Joints 1502 and 1510 may allow for further flexion and stability of the system. They may also be used for adjusting the curvature of screen 1512. Joints 1503, 1505, 1509, 1502, and/or 1510 may be hinges, rollers, balls, wheels, and/or bearings such as ball bearings, roller bearings, ball thrust bearings, roller thrust bearings, tapered roller bearings, magnetic bearings, etc. Joints 1503, 1505, 1509, 1502, and/or 1510 may be coupled to actuators to control their movements. Joints 1502 and/or 1510 may then connect to levers 1501 and 1511, respectively, which are configured to pivot about fulcrum 1515 in order to curve screen 1512 (e.g., by pushing and/or pulling the screen). Levers 1501 and/or 1511 may be rigid bodies, such as static beams, rods, trusses, etc., and/or they may be structures capable of changing lengths, such as telescopic rods, hydraulic jacks, pneumatic cylinders, screws, springs, etc.

Joint 1505 may connect to lever 1507, which may be a rigid body, such as a static beam, rod, truss, etc., and/or it may be a structure capable of changing lengths, such as a telescopic rod, hydraulic jack, pneumatic cylinder, screw, spring, etc. A person having ordinary skill in the art should appreciate that lever 1507 may push or pull a portion of screen 1512. Levers 1501, 1507, and/or 1511 may be coupled to actuator 1500, which may control and/or coordinate the movements of levers 1501, 1507, and/or 1511. For example, actuator 1500 may cause lever 1511 to pivot about fulcrum 1515. It may also cause lever 1507 to lengthen or shorten. Actuator 1500 may also actuate joints 1503, 1502, 1505, 1509, and/or 1510, or be in communication (wired and/or wirelessly) with actuators coupled to those joints.

Any number of levers at various locations may connect to screen 1512 to curve it as desired. For example, additional levers may be aligned vertically on screen 1512 in order to curve the screen both vertically and horizontally at the same time. Additional levers may also be placed at an angle to curve the screen along an angled axis. The levers may also be placed to only curve a portion of screen 1512. They may also be placed to curve screen 1512 into a sphere, torus, and/or elliptical surface.

Figure 15A:
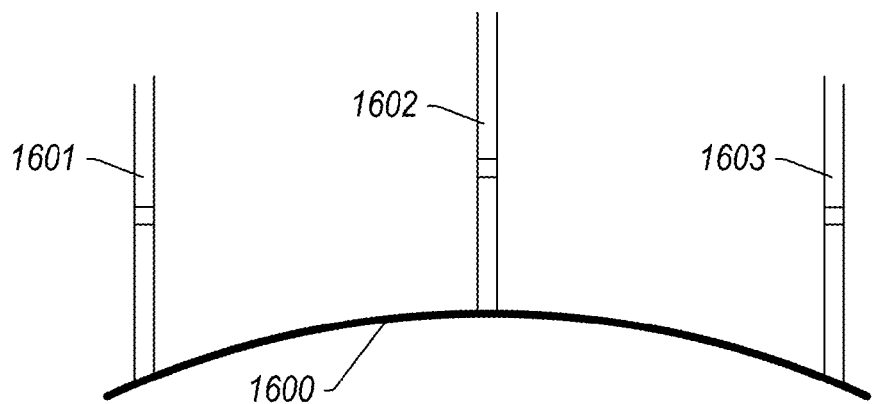
FIG. 15A illustrates an example system using length-adjustable elements that can be used to dynamically curve a screen.

FIG. 15A illustrates an example system using length-adjustable elements that can be used to dynamically curve a screen. Each of length-adjustable elements 1601, 1602, and/or 1603 may be controlled independently and/or may be coupled to one or more actuators. By changing the lengths of one or more of the length-adjustable elements 1601, 1602, and/or 1603, portions of screen 1600 may be pushed and/or pulled, causing the screen to curve. The length-adjustable elements may be telescopic rods, hydraulic jacks, pneumatic cylinders, screws, springs, etc.

Figure 15B:
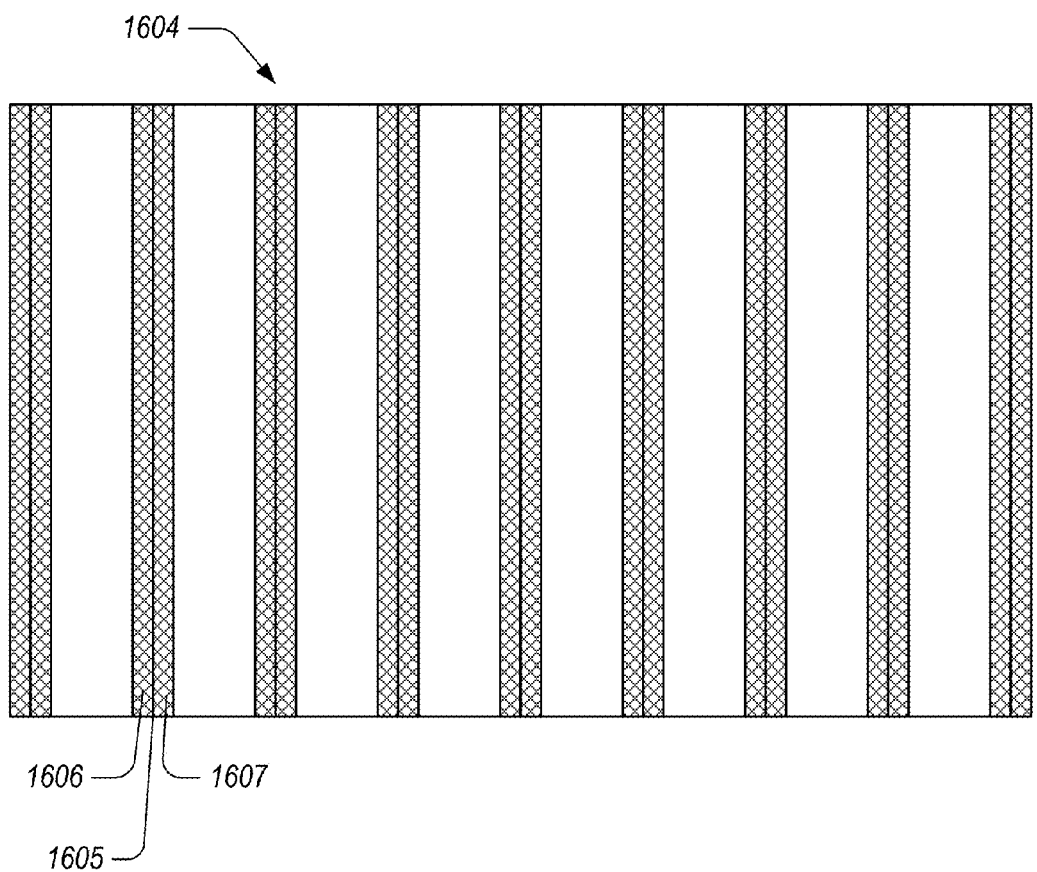
FIG. 15B illustrates an example system using a plurality of hinges that can be used to curve a screen.

FIG. 15B illustrates an example system using a plurality of hinges that can be used to curve a screen. For example, hinge 1605 of screen 1604 comprises wing 1606 and wing 1607. The wings may rotate around a knuckle and pin in order to allow rotation along a vertical axis. Hinge 1605 may be made out of any material or combination of materials, including one or more of metals, polymers, wood, and/or ceramics. In some embodiments, hinge 1605 and/or a plurality of other hinges may be coupled to one or more actuators that move their wings about their knuckles and pins. In some embodiments, the plurality of hinges of screen 1604 may be coordinated and/or synchronized in order to create the desired curve shape. In some embodiments, the hinges may be aligned horizontally in order to turn about a horizontal axis. In this way, the screen may have changing curvature in the vertical direction. Some screens may have hinges in both the horizontal and vertical axes, and/or have hinges aligned at an angle between horizontal and vertical. In this way, screen 1604 may form various shapes including a sphere, a torus, and or an elliptical curve.

The hinges of screen 1604 may be used with other systems for curving a screen described in this disclosure as well as other systems known in the art. For example, the plurality of hinges illustrated in FIG. 15B may be used with the systems illustrated in FIGS. 14, 15A, and/or 16.

Figure 16:
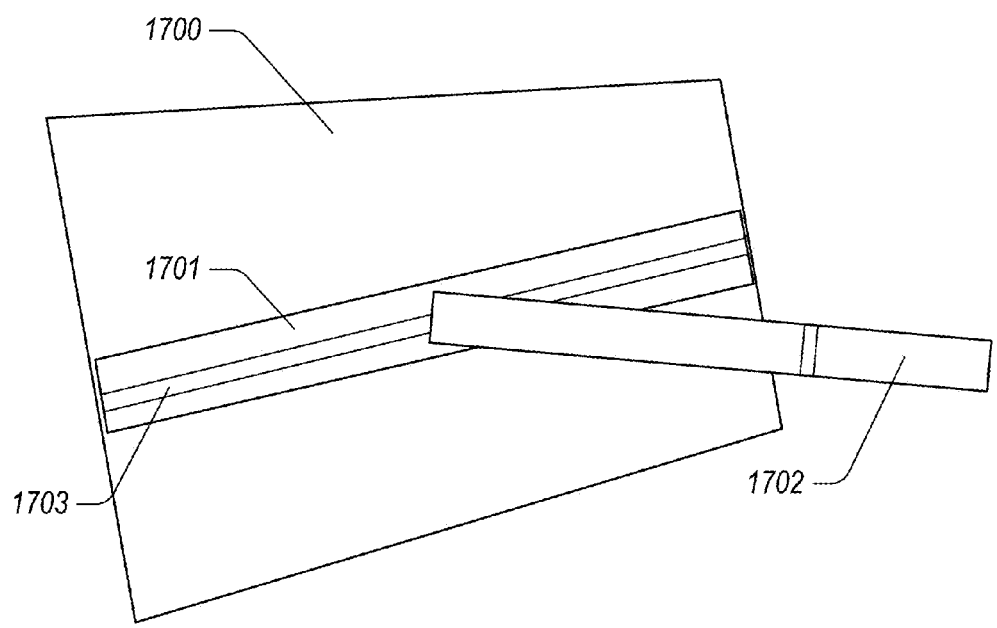
FIG. 16 illustrates an example actuator system using a tension band that can be used to dynamically curve a screen.

FIG. 16 illustrates an example actuator system using a tension band that can be used to dynamically curve a screen. Tension band 1701 may be coupled to screen 1700. The tension band may be configured to hold screen 1700 in a desired curved shape when in an equilibrium state (e.g., when no additional forces are applied). It may also be configured to hold screen 1700 in a flat shape in equilibrium, and/or any disposition between curved and flat. Element 1702 may apply a force to tension band 1701. For example, if tension band 1701 is configured to be curved in equilibrium, element 1702 may push the curved portion of tension band 1701 such that the screen flattens more. As another example, if tension band 1701 is configured to hold screen 1700 in a flat shape, element 1702 may pull a portion of tension band 1701 such that it curves. Element 1702 may be a beam, bar, truss, etc., and/or any structural element known in the art. It may also be a structure that can change lengths, such as a telescopic rod, hydraulic jack, pneumatic cylinder, screw, spring, etc. It may be coupled to rail 1703, which allows it to be repositioned on tension band 1701 in order to manipulate the curvature (or lack thereof) of screen 1700 as desirable. In some embodiments, rail 1701 may be the rail system depicted in FIG. 9.

Tension band 1701 may also be aligned vertically and/or at an angle between horizontal and vertical. Such an arrangement may be desirable to allow screen 1700 to curve into different shapes. In some embodiments, tension bands may be aligned at a variety of angles and/or positions to curve the screen into various shapes, such as spheres, tori, and/or elliptical curves.

Figure 17:
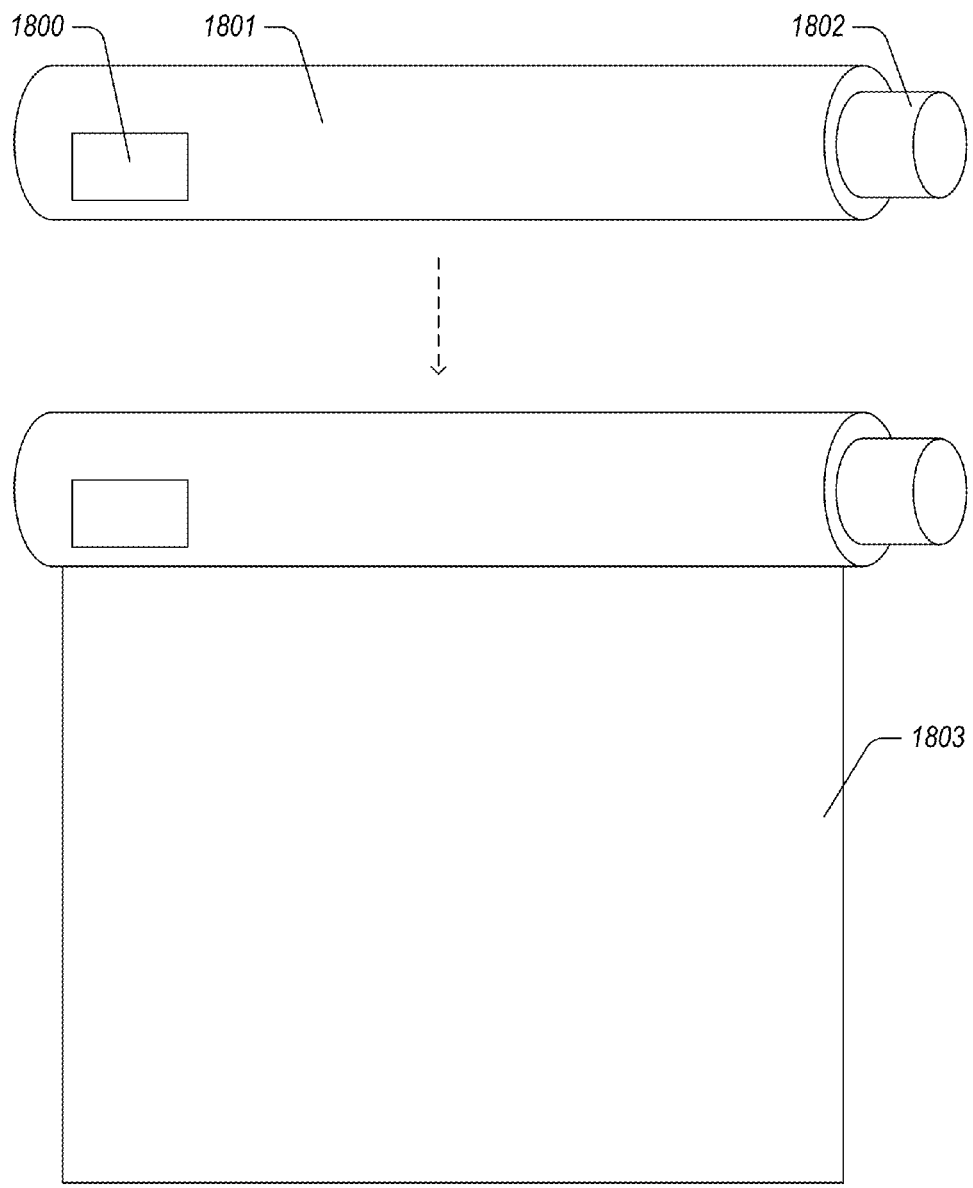
FIG. 17 illustrates an example drum that can be used to store, drop and retract a screen at certain times.

FIG. 17 illustrates an example drum that can be used to store and drop a screen at certain times. Drum 1801 may store screen 1803. Drum 1801 may include transceiver 1800, which receives cues (e.g., metadata cues in cinema content, projectors, and/or servers) to release or pull back screen 1803. Transceiver 1800 may also transmit status information, positional and/or orientation information, and/or any relevant data and/or information to a movie theater system. Actuator 1802 may move screen 1803 up or down.

Figure 18:
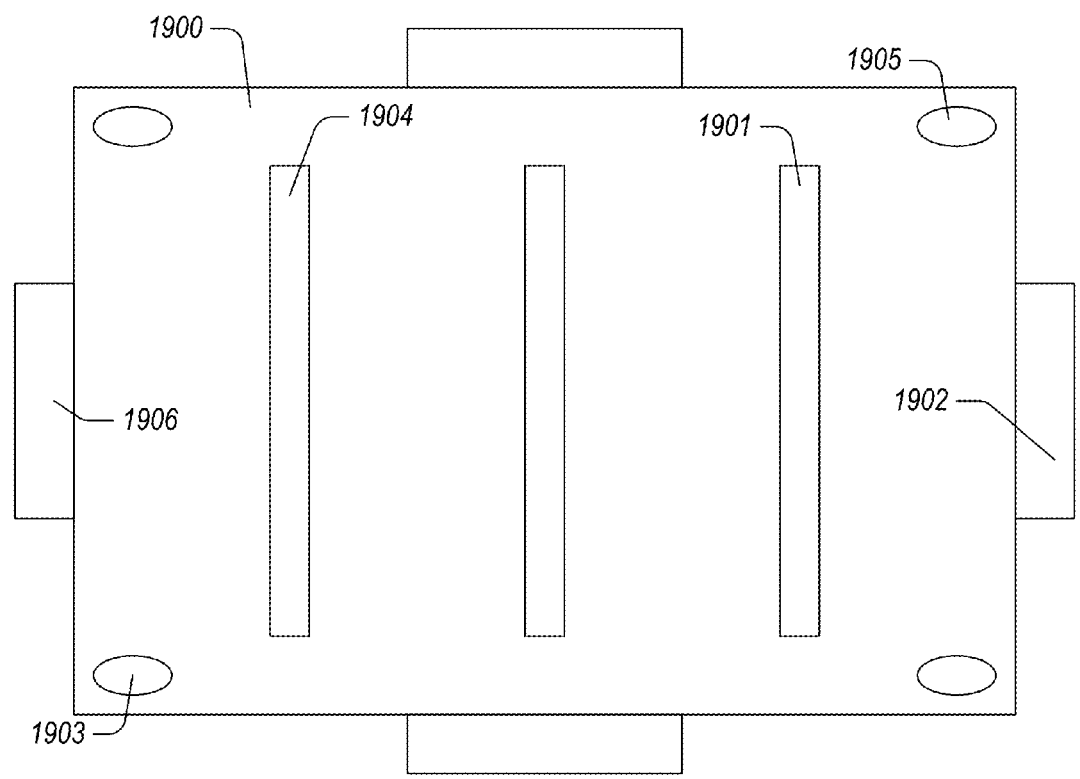
FIG. 18 illustrates various example sensors that may be placed on a screen in order to sense the screen's orientation and/or curvature.

FIG. 18 illustrates various example sensors that may be placed on a screen in order to sense the screen's orientation and/or curvature. The sensors may be placed on various places on screen 1900, including on the front of screen 1900, on the back of screen 1900, and/or embedded in screen 1900. The sensors may also be positioned at various places on or around screen 1900. For example, Sensors 1905 and 1903 are positioned on the top-right and bottom-left, respectively, of screen 1900. Sensors 1904 and 1901 are centrally positioned closer to the middle of screen 1900. Sensors 1906 and 1902 are placed to the left and right, respectively, of screen 1900. Other illustrated sensors are positioned elsewhere.

The sensors may be in active communication with one another, sensing a relative displacement using light such as infrared (IR) light, lasers, electric current, inductance, film resistors, acoustics, and/or any other way of measuring distance between objects known in the art. The may also contain accelerometers and/or gyroscopes that can detect motion. By measuring relative displacement and/or detecting motion, the sensors may be used to detect movement of the screens, such as movement in directions including left, right, up, down, forward, back, roll, pitch, and yaw, and/or any combination of those directions. Sensors may also detect the curvature of the screen as the sensors move closer together or farther apart due to curves in the screen. The sensors may be designed in a variety of shapes and/or positioned in a variety of formations as desirable.

As will later be discussed, the plurality of sensors, including sensors 1901, 1902, 1903, 1904, 1905, and 1906, may also be in active communication with other devices and/or apparatuses.

Figure 19A:
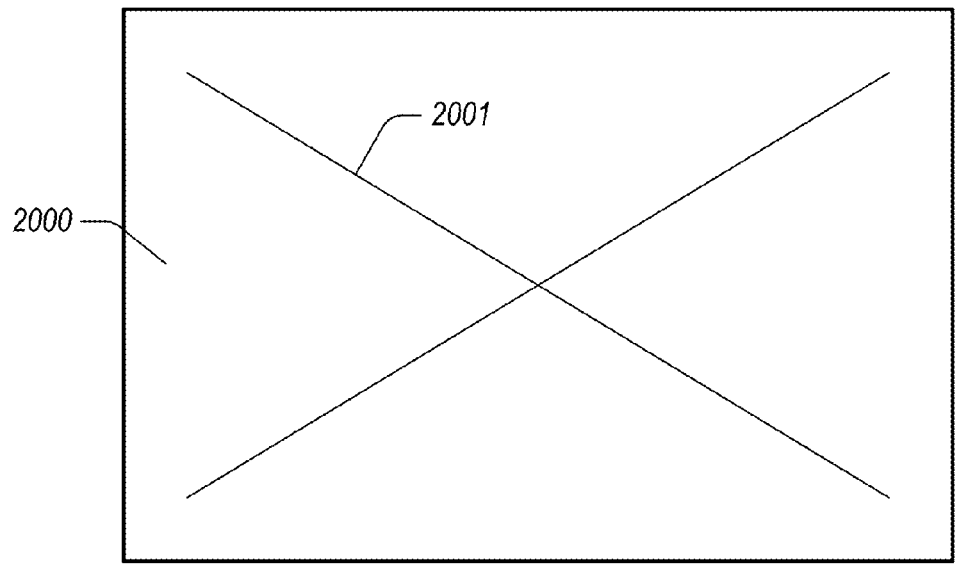
FIGS. 19A-B illustrate various example crossing sensor bands that may be placed on a screen in order to sense the screen's orientation and/or curvature.
Figure 19B:
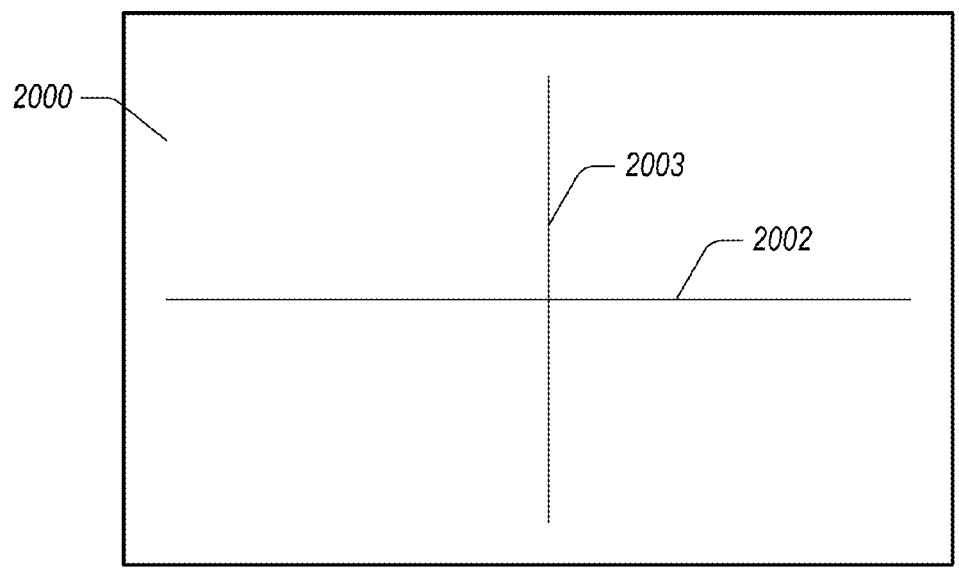

FIG. 19A-B illustrates various example crossing sensor bands that may be placed on a screen in order to sense the screen's orientation and/or curvature. For example, FIG. 19A illustrates sensor band 2001 which may be diagonally disposed on screen 2000. Sensor band 2001 may comprise of a foil strain gauge, a semiconductor strain gauge, a stress sensor, a pressure sensor, and/or a displacement sensor (e.g., a film resistor where resistance changes as film is stretched). Sensor band 2001 may detect changes in stress, strain, pressure, and/or displacement, which corresponds to flexion and/or displacement of portions of screen 2000. For example, when screen 2000 curves, stress is applied to sensor band 2001. The amount of stress may be related (e.g., proportional) to the curvature of screen 2000. A plurality of sensors like diagonal sensor band 2001 may be used.

There are other orientations in which sensor bands can be placed. For example, FIG. 19B shows horizontal sensor band 2002 and vertical sensor band 2003. These may also detect changes in stress, strain, pressure, and/or displacement like sensor band 2001 (FIG. 19A). There may be any number of other orientations for sensor bands, including putting the sensor bands in any portion of screen 2000 and/or at any angle. The sensor bands may also vary in length as desired, where longer sensor bands measure stress, strain, pressure, and/or displacement over a greater area than shorter sensor bands.

Figure 20:
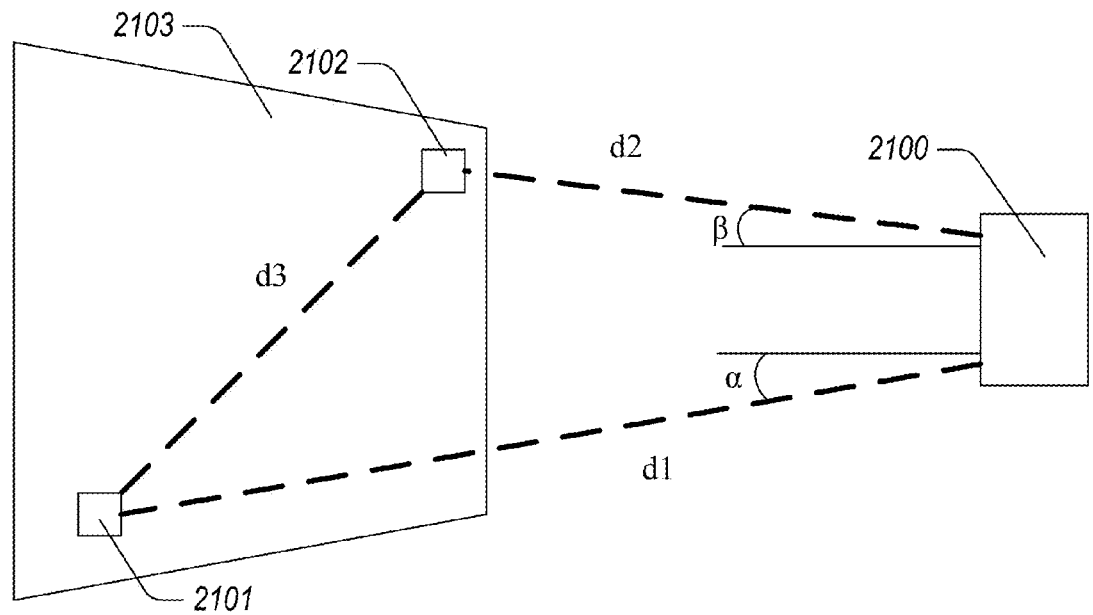
FIG. 20 illustrates an example device that can be used to measure the position of sensors on a screen.

FIG. 20 illustrates an example device that can be used to measure the position of sensors on a screen. In some embodiments, an external device 2100 measures the location of points on the screen, such as points 2101 and 2102. In some embodiments, points 2101 and 2102 of screen 2103 may be distinct markers, such as markers of specific color or reflectance, that external device 2100 can locate using image processing and/or other location techniques. Points 2101 and 2102 may also be the location of sensors and/or transceivers that may communicate with device 2100 using light such as infrared (IR) light, lasers, electric current, inductance, acoustics, and/or any other way of communicating between objects known in the art. The sensors and/or transceivers may also send information giving their position (e.g., using x, y, and z coordinates) to the external device 2100 using Bluetooth, ZigBee, Wi-Fi, induction wireless data transmission, radio frequencies, NFC, GSM, and/or any other form of wireless data transmission.

By locating points 2101 and 2102, external device 2100 may compute the orientation of screen 2103. For example, it can compute the distance screen 2103 is away from the external device 2100, which may indicate where screen 2103 is relative to the audience. It may also compute the angle α between external device 2100 and point 2101, and/or the angle β between external device 2100 and point 2102. This may give additional information about the orientation of screen 2103.

External device 2100 may also compute the angle of screen 2103 by computing the distance d1 from point 2101 and the distance d2 from point 2102. The difference in those distances may be used to compute the rotation of screen 2103. Also, external device 2100 may compute the distance d3 between points 2101 and 2102. This may be further used in determining the orientation of screen 2103 as well as any changes in curvature of screen 2103.

In some embodiments, external device 2100 may be located on a projector in order to assist in the synchronization of the projector with screen 2103's movements. In other embodiments, external device 2100 may be located elsewhere, but be operatively coupled with the movie theater system in order to facilitate synchronization.

The orientation of screen 2103 may be used to synchronize a projector with screen 2103 and/or synchronize screen 2103 with other screens. For example, a projector might need to be repositioned when screen 2103 is angled rather than positioned normal to the projector. A projector may also need to adjust the projected image if screen 2103 is curved. In some embodiments, some of the orientation and/or curvature characteristics of screen 2103 may be known. For example, a user may input the information and/or the information may be set up by the movie theater system a priori. However, sensors may be used to better synchronize the system as there may be slight differences between the actual screen orientation and/or curvature and what was intended. With the use of sensory feedback, the system can react and adjust as needed.

Figure 21:
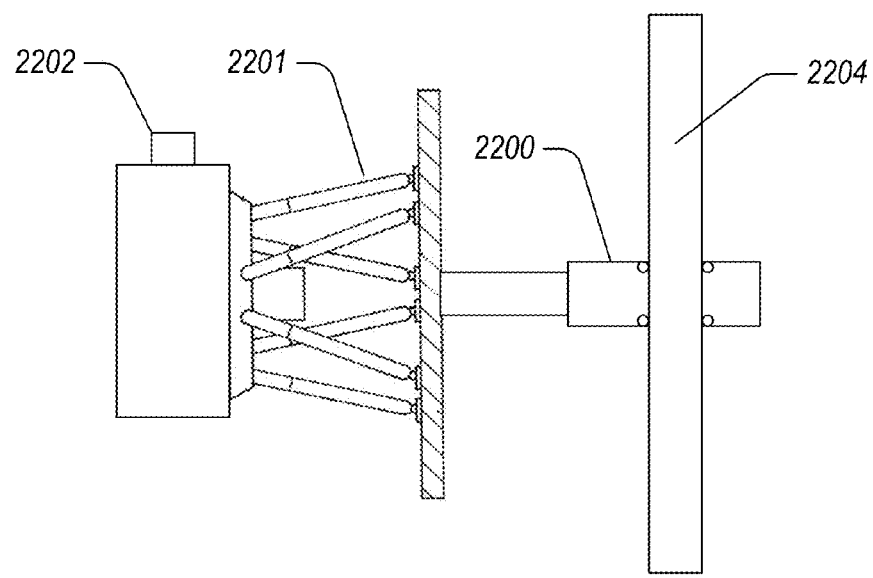
FIG. 21 illustrates an example projector that can synchronize with the movement and/or curvature of screens.

FIG. 21 illustrates an example projector that can synchronize with the movement and/or curvature of screens. Projector 2202 may be any projector described in this disclosure. Projector 2202 may include a lens that can enlarge or shrink the projected image. Projector 2202 may also be coupled to an actuator system 2201, which may be similar to the actuator systems illustrated in FIGS. 10A and 10B. Actuator system 2201 may allow projector 2202 to move in a plurality of directions including up, down, left, right, back, forward, pitch, roll, and yaw, and/or any combination of those directions. Actuator system 2201 may be further coupled to actuator 2200, which allows further vertical movement of projector 2202. Actuator 2200 may comprise of a telescopic rod, hydraulic jack, prismatic joint, pneumatic cylinder, screw, spring and/or any length-adjustable device discussed in this disclosure and/or known in the art. It may also allow projector 2202 to rotate (e.g., rotate around the y-axis). Actuator 2200 may be further coupled to rail system 2204, which may be similar to the rail system illustrated in FIG. 9. This allows further movement of projector 2202. In some embodiments, projector 2202 may also be connected to arm 1200 (FIG. 11).

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems can generally be integrated together in a single product or packaged into multiple products. Additionally, other implementations are within the scope of the following claims. In some cases, the actions recited in the claims can be performed in a different order and still achieve desirable results.

What is claimed is:

1. A system comprising:
 a plurality of movie screens;
 a plurality of actuators coupled to each of the plurality of movie screens, wherein the plurality of actuators are configured to move each of the plurality of movie screens in a plurality of up, down, left, right, back, forward, pitch, roll, and yaw; and
 a processor coupled to the plurality of actuators, the processor configured to:
  control the movement of the plurality of actuators,
  synchronize cinema content for the plurality of movie screens,
  process cinema content for metadata cues indicating movement of the plurality of movie screens, and
  track positions of the plurality of movie screens.

2. The system of claim 1, wherein the one or more actuators are further configured to curve the plurality of movie screens.

3. The system of claim 2, wherein the processor is further configured to adjust cinema content for the curvatures.

4. The system of claim 1, wherein the processor is further configured to coordinate one or more projectors using at least the positions of the plurality of movie screens.

5. The system of claim 1, wherein the plurality of movie screens comprises a front screen, a right screen, and a left screen.

6. The system of claim 5, wherein the right screen and the left screen are trapezoidal in shape.

7. The system of claim 5, wherein the right screen and left screen are further coupled to a rail system that is configured to slide the right screen and the left screen.

8. A method, comprising:
projecting a cinema presentation onto a plurality of movie screens;
analyzing metadata cues in the cinema presentation;
moving one or more of the plurality of movie screens in a plurality of up, down, left, right, back, forward, pitch, roll, and yaw based on at least the metadata cues; and
synchronizing the cinema presentation projection to the movement of the one or more of the plurality of movie screens.

9. The method of claim 8, further comprising curving one or more of the plurality of movie screens in response to the metadata cues.

10. The method of claim 8, further comprising storing one or more of the plurality of movie screens in drums and then dropping down the stored movie screens in response to metadata cues.

11. The method of claim 8, wherein the movement occurs in at least one of before, during, and after a movie presentation.

12. The method of claim 8, further comprising curving one or more of the plurality of movie screens at least one of before, during, and after a movie presentation.

13. The method of claim 8, further comprising storing one or more of the plurality of movie screens in drums and then dropping down the stored movie screens at least one of before, during, and after a movie presentation.

* * * * *